United States Patent
Mori

(10) Patent No.: US 12,275,486 B2
(45) Date of Patent: Apr. 15, 2025

(54) VEHICLE

(71) Applicant: Honda Motor Co., Ltd., Tokyo (JP)

(72) Inventor: Yotaro Mori, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/022,495

(22) PCT Filed: Aug. 19, 2021

(86) PCT No.: PCT/JP2021/030336
§ 371 (c)(1),
(2) Date: Feb. 21, 2023

(87) PCT Pub. No.: WO2022/044944
PCT Pub. Date: Mar. 3, 2022

(65) Prior Publication Data
US 2023/0348011 A1 Nov. 2, 2023

(30) Foreign Application Priority Data

Aug. 28, 2020 (JP) .................................. 2020-144531

(51) Int. Cl.
*B62K 5/027* (2013.01)
*B62J 43/16* (2020.01)
(Continued)

(52) U.S. Cl.
CPC ............... *B62K 5/027* (2013.01); *B62J 43/16* (2020.02); *B62J 43/20* (2020.02); *B62K 3/002* (2013.01); *B62K 2204/00* (2013.01)

(58) Field of Classification Search
CPC .. B62K 5/027; B62K 5/06; B62K 5/02; B62B 3/12; B62B 3/1404; B62B 3/14
See application file for complete search history.

(56) References Cited

U.S. PATENT DOCUMENTS

| 4,087,107 A | * | 5/1978 | Winchell | ................ B62K 5/10 |
| | | | | 180/21 |
| 6,220,612 B1 | | 4/2001 | Beleski, Jr. | |

(Continued)

FOREIGN PATENT DOCUMENTS

| CN | 101282866 A | 10/2008 |
| CN | 201566671 U | 9/2010 |

(Continued)

OTHER PUBLICATIONS

Computer generated English translation of JPS59153674 (Year: 2024).*

(Continued)

*Primary Examiner* — Paul N Dickson
*Assistant Examiner* — Tiffany L Webb
(74) *Attorney, Agent, or Firm* — Duft & Bornsen, PC

(57) ABSTRACT

A vehicle including a front wheel, a pair of left and right rear wheels disposed diagonally behind the front wheel on a left side and a right side, and a pair of left and right support members extending in a front-rear direction and including support portions rotatably supporting the pair of left and right rear wheels. The pair of left and right support members are disposed so as to be separated from each other by a predetermined distance so that a front wheel of another vehicle configured to have a same shape as the vehicle is insertable into a gap between the pair of left and right support members from a rear side.

13 Claims, 17 Drawing Sheets

(51) Int. Cl.
*B62J 43/20* (2020.01)
*B62K 3/00* (2006.01)

(56) References Cited

U.S. PATENT DOCUMENTS

| | | | | |
|---|---|---|---|---|
| 8,807,581 | B2 * | 8/2014 | Liao | B62K 19/30 |
| | | | | 280/87.041 |
| 10,144,476 | B2 * | 12/2018 | Desberg | B62K 3/002 |
| 10,179,624 | B1 * | 1/2019 | O'Donnell | B62M 6/40 |
| 10,843,760 | B2 * | 11/2020 | Desberg | B62K 3/002 |
| 11,964,727 | B2 * | 4/2024 | Mori | B62K 21/00 |

FOREIGN PATENT DOCUMENTS

| | | | |
|---|---|---|---|
| CN | 107499152 | A | 12/2017 |
| DE | 202009010927 | U1 | 12/2010 |
| JP | S5847676 | A | 3/1983 |
| JP | S59153674 | A | 9/1984 |
| JP | H08310254 | A | 11/1996 |
| JP | 3184391 | U | 6/2013 |
| JP | 2017109551 | A | 6/2017 |
| WO | 2012154141 | A1 | 11/2012 |

OTHER PUBLICATIONS

Computer generated English translation of WO2017104193 (Year: 2024).*
European Search Report; Application EP21861372; Jan. 29, 2024.
International Search Report; Application PCT/JP2021/030336; Nov. 2, 2021.

* cited by examiner

FRONT ← → REAR

FRONT ← → REAR

VEHICLE

CROSS-REFERENCE TO RELATED APPLICATION

This application is a National Stage of PCT international application Ser. No. PCT/JP2021/030336 filed on Aug. 19, 2021 which designates the United States, incorporated herein by reference, and which is based upon and claims the benefit of priority from Japanese Patent Application No. 2020-144531, filed on Aug. 28, 2020, the entire contents of which are incorporated herein by reference.

TECHNICAL FIELD

This invention relates to a vehicle including a front wheel and a rear wheel.

BACKGROUND ART

Conventionally, an electric three wheeled vehicle having a single front wheel and a pair of left and right rear wheels has been known (for example, see Patent Literature 1). In the vehicle described in Patent Literature 1, a pair of left and right steps in which feet of an occupant in a standing posture are placed are provided inside the left and right rear wheels, a steering wheel for turning the front wheel is provided above the front wheel, and the rear wheels are driven by an electric motor so that the vehicle travels.

CITATION LIST

Patent Literature

Patent Literature 1: Japanese Unexamined Patent Publication No. H8-310254

DISCLOSURE OF INVENTION

Problems to be Solved by the Invention

When a vehicle configured as described in Patent Literature 1 is parked alone, a large parking space is not required. However, when a plurality of vehicles are parked, a large parking space is required. For this reason, it is required to be able to efficiently park a vehicle in a limited space.

Means for Solving Problem

An aspect of the present invention is a vehicle including a front wheel, and a pair of left and right rear wheels disposed diagonally behind the front wheel on a left side and diagonally behind the front wheel on a right side, wherein the vehicle further includes a pair of left and right support members extending in a front-rear direction and including support portions rotatably supporting the pair of left and right rear wheels. The pair of left and right support members are disposed so as to be separated from each other by a predetermined distance so that a front wheel of another vehicle configured to have a same shape as the vehicle is insertable into a gap between the pair of left and right support members from a rear side.

Effect of the Invention

According to the present invention, it is possible to efficiently park a plurality of vehicles in a limited space.

DESCRIPTION OF EMBODIMENT

First Embodiment

Hereinafter, a first embodiment of the present invention will be described with reference to FIGS. 1 to 7. A vehicle according to the first embodiment of the present invention is a three-wheeled vehicle including a single front wheel and a pair of left and right rear wheels, and is configured such that a user can ride in a standing posture. This vehicle is used as, for example, a sharing vehicle that can be used by a large number of users, and a plurality of vehicles is gathered and parked at a predetermined place (station).

Figure 1:
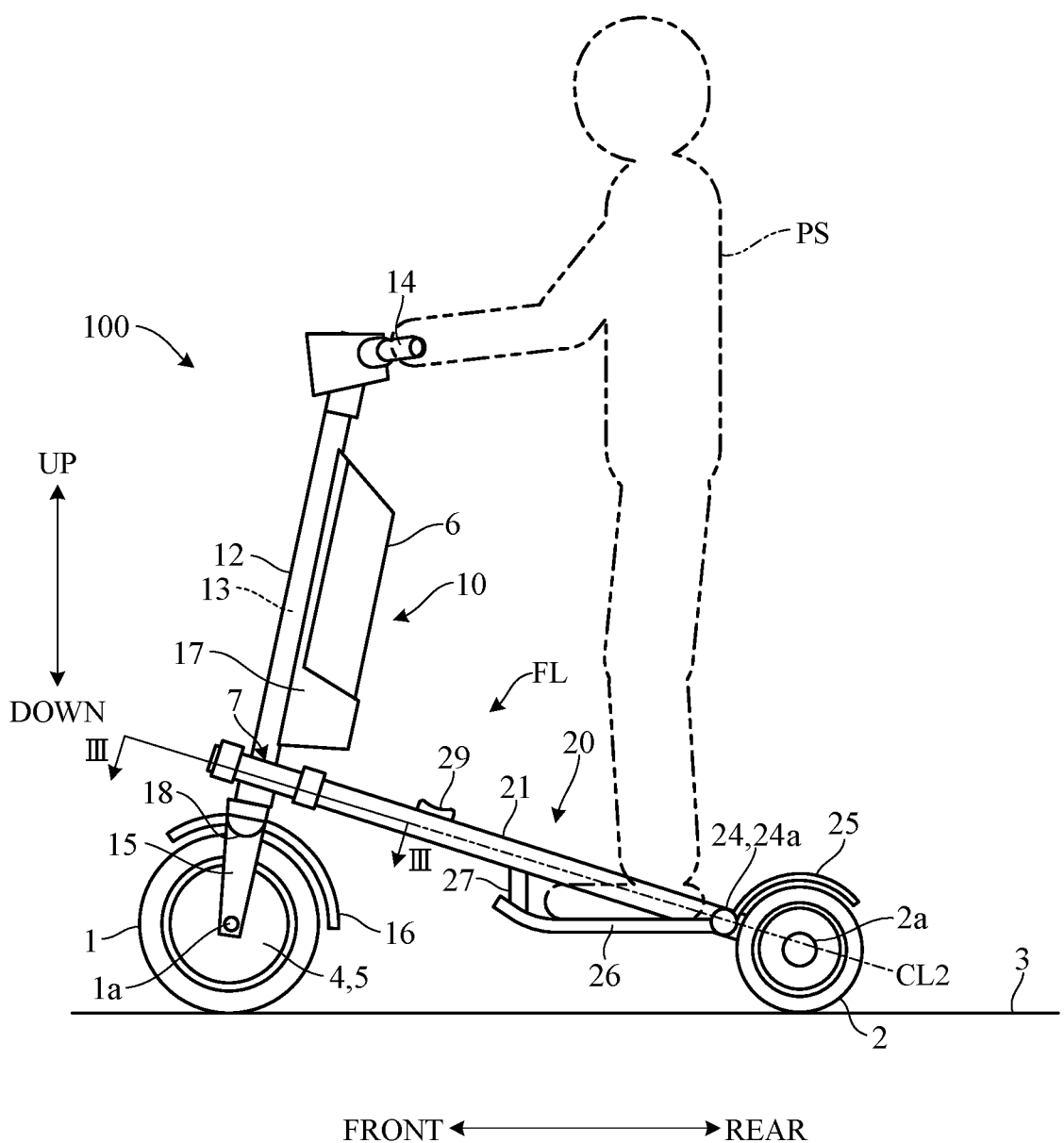
FIG. 1 is a side view illustrating an overall configuration of a vehicle according to a first embodiment of the present invention.
Figure 2:
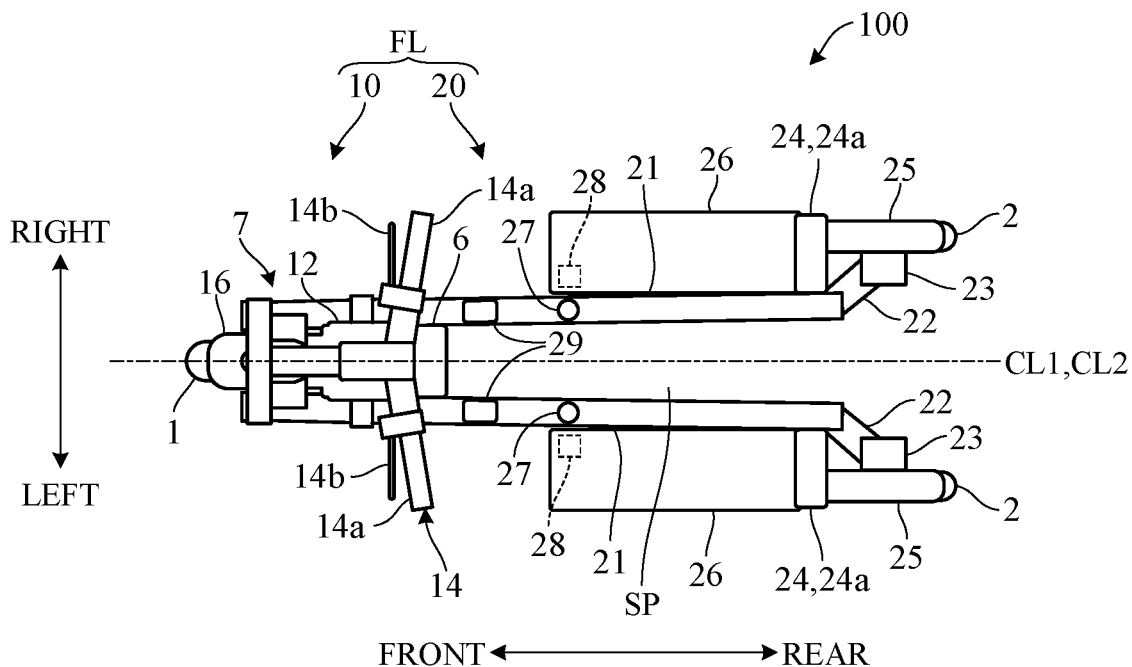
FIG. 2 is a plan view illustrating the overall configuration of the vehicle according to the first embodiment of the present invention.

FIG. 1 is a side view illustrating an overall configuration of a vehicle 100 according to the first embodiment of the present invention, and FIG. 2 is a plan view. FIG. 1 also illustrates a use state of a user PS (two-dot chain line). Hereinafter, a front-rear direction (length direction), a left-right direction (width direction), and an up-down direction (height direction) of the vehicle 100 are defined as illustrated, for the sake of convenience, and a configuration of each portion will be described according to this definition.

As illustrated in FIGS. 1 and 2, the vehicle 100 includes a front wheel 1 and rear wheels 2, and a frame FL constituting a skeleton of the vehicle 100, and is configured to be generally symmetric with respect to a center line CL1 (FIG. 2) passing through a center of the vehicle 100 in the left-right direction. More specifically, the front wheel 1 is disposed along the center line CL1, and the left and right rear wheels 2 are disposed at symmetrical positions across the center line CL1. The front wheel 1 has a larger diameter than the rear wheels 2. The front wheel 1 may have the same diameter as the rear wheels 2, or the rear wheels 2 may have larger diameters than the front wheel 1.

The frame FL includes a front frame 10 and a rear frame 20. As illustrated in FIG. 1, a part of the frame FL extends along an axis CL2 passing through the center of the vehicle 100 in the left-right direction above the center line CL1, more specifically, the axis CL2 extending obliquely with a rising gradient to the front (upward to the front). As illustrated in FIG. 2, the axis CL2 overlaps the center line CL1 of the vehicle 100 in plan view.

Figure 3:
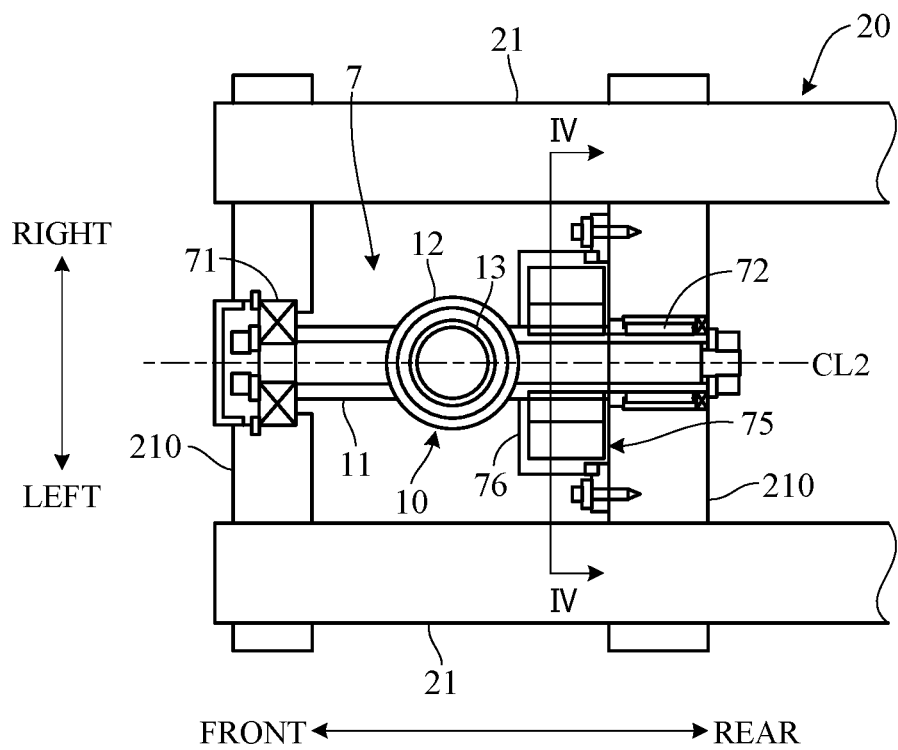
FIG. 3 is a cross-sectional view taken along line in FIG. 1.

FIG. 3 is a cross-sectional view taken along the axis CL2 (cross-sectional view taken along line in FIG. 1) illustrating the configuration of a main part on the front side of the vehicle 100. As illustrated in FIGS. 1 and 3, the front frame 10 includes a support frame 11 having a substantially cylindrical shape in cross-section and extending in the front-rear direction along the axis CL2, that is, extending obliquely with a rising gradient to the front, and a vertical frame 12 having a substantially cylindrical shape in cross-section and provided integrally with the support frame 11 through a center portion of the support frame 11 in the front-rear direction. The vertical frame 12 extends obliquely in the up-down direction such that an upper end portion is positioned behind a lower end portion, and a handlebar shaft 13 having a substantially circular shape in cross-section is rotatably inserted into the vertical frame 12. A center portion of a handlebar 14 in the left-right direction is fixed to an upper end portion of the handlebar shaft 13, and a front fork 15 is fixed to a lower end portion.

The front wheel 1 is rotatably supported via a rotation shaft 1a supported by the front fork 15. The front wheel 1 is steered by a rotation operation of the handlebar 14 about the handlebar shaft 13. As illustrated in FIG. 2, the handlebar 14 extends in the left-right direction, and grips 14a gripped by the user PS are provided at both left and right end portions. As illustrated in FIG. 1, a front fender 16 having a substantially arc shape is attached to the front fork 15 so as to cover the periphery of the front wheel 1 from the upper side to the rear side of the front wheel 1.

Although not illustrated in detail, a traveling motor 4 (in-wheel motor) and a brake unit 5 are housed inside the front wheel 1. For example, the traveling motor 4 is disposed on the left side, and the brake unit 5 is disposed on the right part. The vehicle 100 is configured as an electric vehicle that travels by driving of the traveling motor 4. The brake unit 5 is configured as, for example, a drum brake unit constituting a drum brake. Although not illustrated, the rear wheels 2 are also provided with brake units. These brake units are actuated by an operation of brake levers 14b provided in front of the grips 14a of the handlebar 14 as illustrated in FIG. 2, and a braking force is applied to the front wheel 1 and the rear wheels 2. The traveling motor 4 may be provided in the rear wheels 2 instead of the front wheel 1, or in both the front wheel 1 and the rear wheels 2. Thus, the towing ability and the climbing ability can be improved.

As illustrated in FIG. 1, a holder 17 is attached to a rear surface of the vertical frame 12, and a battery 6 is supported by the holder 17. The battery 6 is a secondary battery such as a lithium ion battery in which electric power supplied to the traveling motor 4, which is an electric motor, is stored, and the electric power supplied from the battery 6 to the traveling motor 4 is controlled by a power control unit, which is not illustrated. Although not illustrated, the handlebar 14 is provided with a display portion that displays vehicle information such as a remaining battery capacity and a set vehicle speed, and is provided with a starter switch that gives an instruction of on and off of a main power supply, an accelerator lever that inputs a traveling command, and the like so as to be operable by the user PS. The battery 6 may be disposed inside or around another structural member.

As illustrated in FIGS. 1 and 2, the rear frame 20 includes a pair of left and right support frames 21 having a substantially cylindrical shape in cross-section extending in the front-rear direction along the axis CL2, i.e., extending obliquely with a rising gradient to the front. Brackets 22 are joined to rear end portions of the left and right support frames 21. The left and right brackets 22 extend rearward and outward in the left-right direction, and rear wheel support portions 23 are provided at rear end portions of the brackets 22. The rear wheels 2 are rotatably supported via rotation shafts 2a supported by the rear wheel support portions 23.

In front of the rear wheels 2, the left and right support frames 21 are provided with side frames 24 protruding outward in the left-right direction. Rear fenders 25 are attached to rear end portions of the side frames 24 so as to cover the periphery of the rear wheels 2 from the front side to the upper side and the rear side of the rear wheels 2. The side frames 24 are provided with shaft portions 24a extending in the left-right direction. Steps (footrests) 26 that are plate members having a substantially rectangular shape in plan view and extending in the front-rear direction are disposed adjacent to the support frames 21 on outer sides of the left and right support frames 21 in the left-right direction. Rear end portions of the steps 26 are rotatably supported by the shaft portions 24a. A maximum width of the vehicle 100 is defined by, for example, the handlebar 14 or the steps 26.

Rods 27 are provided to protrude downward at center portions of the left and right support frames 21 in the front-rear direction. Support plates 28 (FIG. 2) are provided to protrude outward in the left-right direction at lower end portions of the left and right rods 27. Front end portions of the steps 26 are placed on upper surfaces of the support plates 28, and thus the downward rotation of the steps 26 is restricted. At this time, upper surfaces of the steps 26 extend in a horizontal direction in parallel with a road surface 3, and the steps 26 take a horizontal posture. The position of the steps 26 in this case (FIG. 1) is referred to as a horizontal position. When the steps 26 are in the horizontal posture, the user PS can ride with the feet on the steps 26. When the steps 26 rotate upward using the shaft portions 24a as a fulcrum, the steps 26 take an upward inclined posture in which the front end portions have moved upward to the front. The position of the steps 26 is referred to as an inclined position.

When another vehicle 100 is parked behind the vehicle 100 (FIG. 5) as described below, the protrusion amount of the support plates 28 in the left-right direction is defined so as not to interfere with the rear wheels 2 of the other vehicle 100. For example, the support plates 28 are disposed such that distal end portions thereof are positioned on inner sides with respect to the rear wheels 2 in the left-right direction. The support plates 28 may be omitted, and a portion or a mechanism that restricts the downward rotation of the steps 26 may be provided on the shaft portions 24a.

The steps 26 are positioned below upper end portions of the rear wheels 2 in the horizontal posture. Thus, the center of gravity position of the user PS who rides on the vehicle 100 is lowered, and the stability at the time of riding on the vehicle is enhanced. The steps 26 in the horizontal posture are positioned above the rotation shafts 2a of the rear wheels 2. As illustrated in FIG. 1, the front end portions of the steps 26 are formed to be inclined upward to the front. Thus, it is possible to prevent the feet of the user PS from moving forward beyond the steps 26. In addition, the feet of the occupant can be protected in a case where the front end portions of the steps 26 collide with an obstacle on the road surface during traveling. Since the side frames 24 are provided at the rear end portions of the steps 26 so as to bulge upward beyond the upper surfaces of the steps 26, it is also possible to prevent the feet of the user PS from moving rearward beyond the steps 26.

The front frame 10 and the rear frame 20 are swingably coupled via a coupling portion 7. Hereinafter, a configuration of the coupling portion 7 will be described. As illustrated in FIG. 3, a pair of front and rear coupling frames 210 having a substantially cylindrical shape in cross-section is joined to front end portions of the left and right support frames 21 of the rear frame 20. For example, the coupling frames 210 are joined to the support frames 21 such that the support frames 21 penetrate the coupling frames 210 in the front-rear direction. The front and rear coupling frames 210 extend in the left-right direction so as to be orthogonal to the support frames 21. Bearings 71 and 72 are provided at center portions in the left-right direction of the front and rear coupling frames 210, respectively, and both front and rear end portions of the support frame 11 are rotatably supported by the coupling frames 210 via the bearings 71 and 72. Thus, the front frame 10 (support frame 11) can swing in the left-right direction about the axis CL2 with respect to the rear frame 20.

The coupling portion 7 is provided with a damper member (spring member) that exerts a restoring force that restricts swinging of the front frame 10 with respect to the rear frame 20. In the present embodiment, a Neidhart rubber spring 75 is used as the spring member, and a cover 76 of the Neidhart rubber spring 75 is fixed to a front surface of the rear coupling frame 210 with a bolt.

Figure 4:
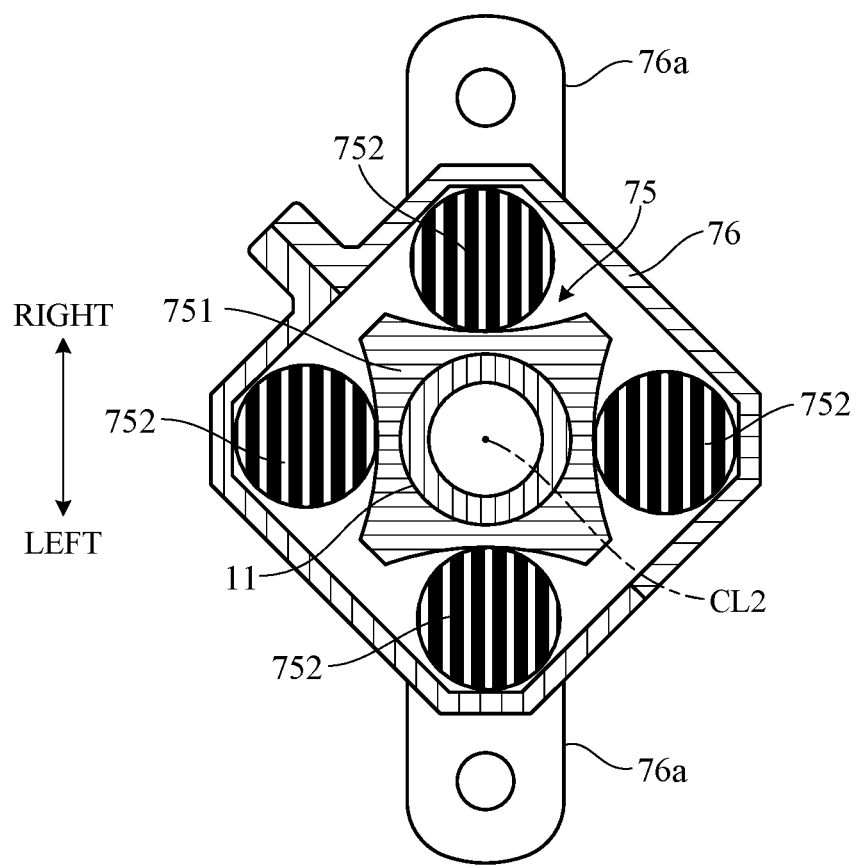
FIG. 4 is a cross-sectional view taken along line IV-IV in FIG. 3.

FIG. 4 is a cross-sectional view taken along line IV-IV of FIG. 3 illustrating a configuration of the Neidhart rubber spring 75. As illustrated in FIGS. 3 and 4, the cover 76 is generally formed in a substantially box shape, and flange portions 76a for attachment to the coupling frame 210 are provided at both left and right end portions of the cover 76. The Neidhart rubber spring 75 includes a cam block 751 having a substantially rhombic shape connected (for example, connected via splines or serrations) to an outer peripheral surface of the support frame 11 so as to be rotatable integrally with the support frame 11, and a plurality of rubber rollers 752 disposed to face each surface formed in a recessed shape of the cam block 751.

FIG. 4 illustrates a mode of the Neidhart rubber spring 75 when the front frame 10 is in a reference posture. The reference posture refers to a neutral state in which the handlebar shaft 13 is disposed without being inclined in the left-right direction, and in this state, a restoring force does not act on the Neidhart rubber spring 75. When torque acts on the support frame 11 as a result of the swinging of the front frame 10 in the state of FIG. 4 and the support frame 11 rotates about the axis CL2, the rubber rollers 752 are pressed and elastically deformed between the cover 76 and the cam block 751, and the rubber rollers 752 becomes elliptical. At this time, as the rotation angle of the support frame 11 increases, the rotational resistance to the cover 76 increases. When torque acting on the support frame 11 becomes zero, the rubber rollers 752 return to the original shapes by the elastic forces, and the front frame 10 returns to the reference posture.

By providing the front frame 10 to be swingable via the coupling portion 7 in this manner, the user can easily turn the vehicle in the left-right direction. For example, when turning the vehicle 100 in the left-right direction, the user PS slightly bends the knees and the ankles and inclines the upper body to the left or right. Thus, it is possible to swing the front frame 10 in a stable posture with both feet placed on the steps 26, and incline the front wheel 1 to the left or right. As a result, the vehicle 100 can be smoothly turned, and the turning performance is improved. In addition, the axis CL2 extends upward to the front (FIG. 1). Therefore, when the vehicle 100 turns, the steering angle of the front wheel 1 with respect to the rear wheels 2 can be increased. As a result, the turning radius can be reduced, and the turning performance can be further improved.

Furthermore, since the Neidhart rubber spring 75 is provided in the coupling portion 7, when the front frame 10 is swung from the reference posture, the restoring force acts on the front frame 10, and the swinging of the front frame 10 can be favorably suppressed. The number of the rubber rollers 752 of the Neidhart rubber spring 75 may be smaller or larger than four. Hence, the cam block 751 may be other than rhombic. The restoring force may be acted on the front frame 10 using an elastic member such as a coil spring instead of the Neidhart rubber spring 75. That is, the configuration of the damper member is not limited to the Neidhart rubber spring 75.

Although not illustrated, the load point acting on the steps 26 by the weight of the user PS when riding on the vehicle is positioned within a triangular region connecting the grounding point of the front wheel 1 and the grounding points of the pair of left and right rear wheels 2 in plan view. Thus, the user PS can ride on the vehicle 100 in a stable posture during both traveling and stopping.

Figure 5:
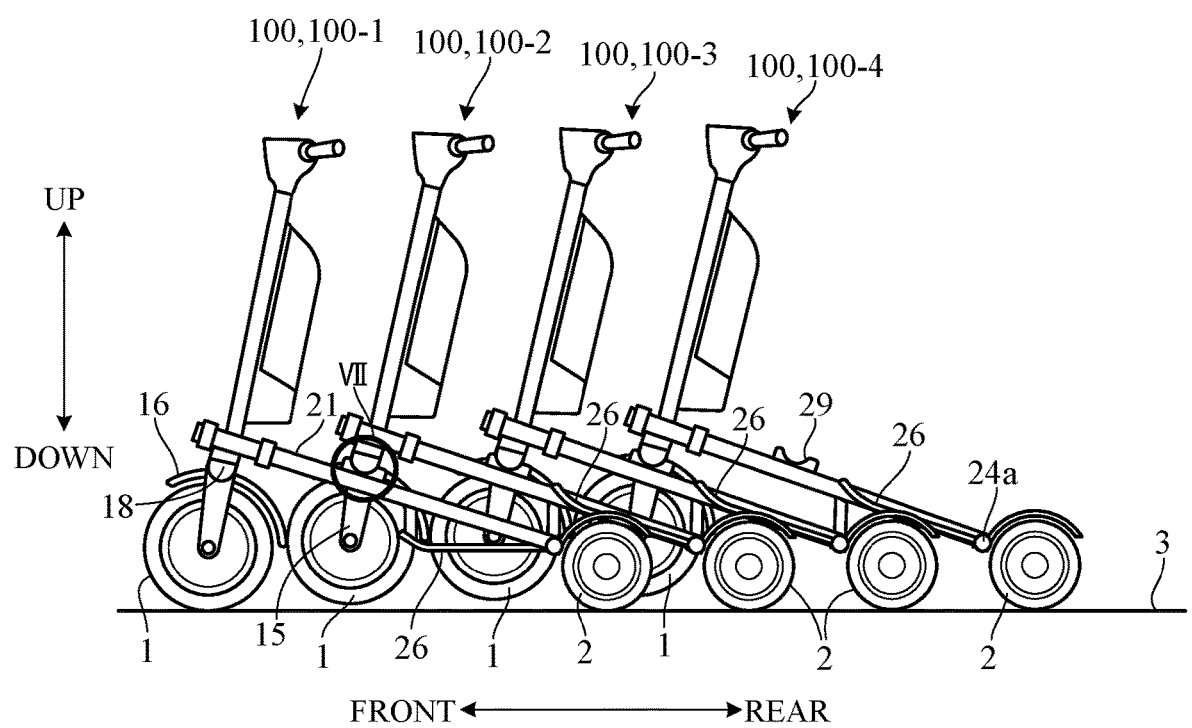
FIG. 5 is a side view illustrating an example of parking a plurality of vehicles according to the first embodiment of the present invention.
Figure 6:
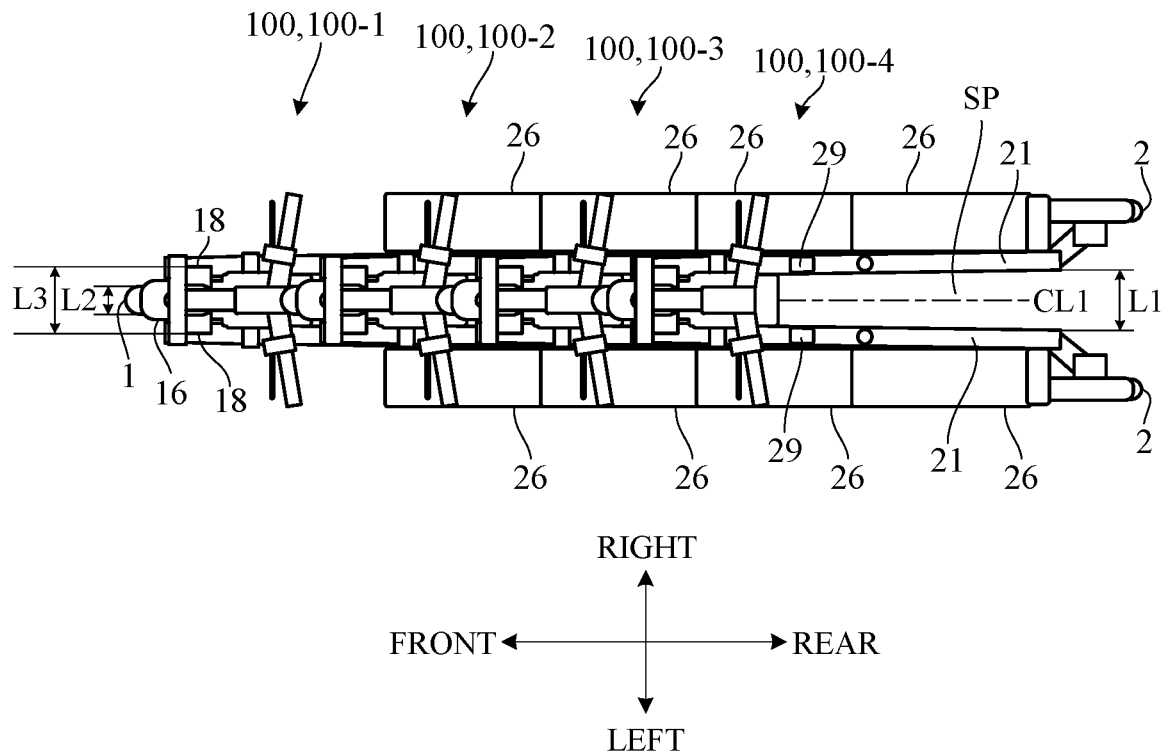
FIG. 6 is a plan view illustrating an example of parking a plurality of vehicles according to the first embodiment of the present invention.

A plurality of vehicles 100 according to the present embodiment can be efficiently parked in a limited space. This point will be described below. FIG. 5 is a side view illustrating an example of parking a plurality of (for example, four) vehicles 100 according to the first embodiment, and FIG. 6 is a plan view. The vehicles 100 have the same configuration, and for the sake of convenience, the vehicles 100 may be referred to as a first vehicle 100-1, a second vehicle 100-2, a third vehicle 100-3, and a fourth vehicle 100-4 in order from the front side.

As illustrated in FIG. 6, each vehicle 100 includes the pair of left and right support frames 21, but the left and right support frames 21 are disposed to be separated from each other by a predetermined distance L1 across the center line CL1, and a gap SP having an open rear surface is formed between the left and right support frames 21. The distance L1 is longer than a width L2 of the front wheel 1 in the left-right direction. Thus, the front wheel 1 of another vehicle 100 can be inserted into the gap SP of the vehicle 100 from the rear. That is, the front wheel 1 of the second vehicle 100-2 can be inserted into the gap SP of the first vehicle 100-1, the front wheel 1 of the third vehicle 100-3 can be inserted into the gap SP of the second vehicle 100-2, and the front wheel 1 of the fourth vehicle 100-4 can be inserted into the gap SP of the third vehicle 100-3.

When the front wheel 1 is inserted into the gap SP of the front vehicle 100, the front end portions of the steps 26 in the horizontal posture come into contact with rear surfaces of the rear wheels 2 of the front vehicle 100, that is, rear surfaces above the rotation shafts 2a. Thus, as illustrated in FIG. 5, the front end portions of the steps 26 rotate using the shaft portions 24a as a fulcrum and are pushed upward along the rear wheels 2, and the steps 26 take an inclined posture. That is, the steps 26 of the second vehicle 100-2 are pushed upward along the rear wheels 2 of the first vehicle 100-1, the steps 26 of the third vehicle 100-3 are pushed upward along the rear wheels 2 of the second vehicle 100-2, and the steps 26 of the fourth vehicle 100-4 are pushed upward along the rear wheels 2 of the third vehicle 100-3.

The steps 26 are positioned above the rotation shafts 2a of the rear wheels 2 in the horizontal posture (FIG. 1). Therefore, when the front end portions of the steps 26 come into contact with the rear wheels 2 of the front vehicle 100, the steps 26 can be smoothly rotated upward. Note that when the front end portions of the steps 26 are provided to be inclined upward to the front so that the front end portions of the steps 26 come into contact with the rear wheels 2 above the rotation shafts 2a of the rear wheels 2, the steps 26 (horizontal portions other than the front end portions) may be positioned at the same height as the rotation shafts 2a or below the rotation shafts 2a. However, in order to prevent bottom surfaces of the steps 26 from interfering with the unevenness of the road surface 3, the steps 26 are preferably positioned above the rotation shafts 2a.

When the pair of left and right support frames 21 are disposed in a state of being separated from each other and in a state in which the gap SP between the support frames 21 faces the rear and is opened as described above, the front wheel 1 can be inserted into the gap SP of the front vehicle 100 so that a plurality of vehicles 100 can be parked.

Therefore, the entire length of the plurality of vehicles 100 in the parked state in the front-rear direction can be shortened, and the plurality of vehicles 100 can be efficiently parked in a limited parking space. In addition, since the steps 26 are provided so as to be rotatable about the shaft portions 24a, the steps 26 can be retracted above the rear wheels 2 of the front vehicle 100 at the time of parking. As a result, the steps 26 can be disposed below the upper surfaces of the rear wheels 2 in the horizontal posture, and the center of gravity position of the user PS at the time of riding on the vehicle is lowered, thereby improving the traveling stability.

As illustrated in FIG. 1, pins 18 are provided on left and right outer side surfaces of the front fork 15 of the front frame 10 so as to protrude outward in the left-right direction. Lower sides of the pins 18 are formed in a substantially arc shape (for example, a semicircular shape). As illustrated in FIG. 6, a length L3 from a distal end portion (right end portion) of the right pin 18 to a distal end portion (left end portion) of the left pin 18 is longer than the distance L1 between inner side surfaces of left and right support frames 21. As illustrated in FIGS. 1 and 2, guides 29 are provided on upper surfaces of the left and right support frames 21.

Figure 7:
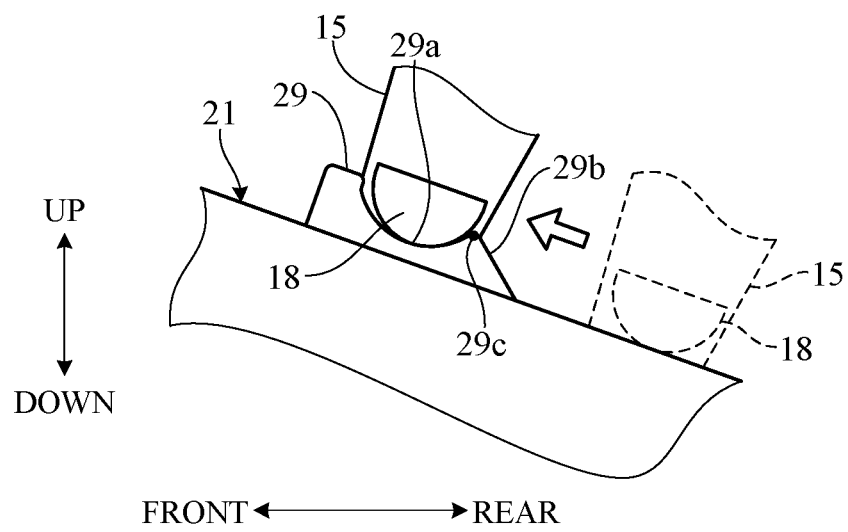
FIG. 7 is an enlarged view of part VII of FIG. 5.

FIG. 7 is an enlarged view of a main part (enlarged view of part VII) of FIG. 5 schematically illustrating the configuration of the guide 29. As illustrated in FIG. 7, the guide 29 is formed to bulge upward on the upper surface of the support frame 21. On the upper surface of the guide 29, a recessed portion 29a having a substantially arc shape corresponding to the pin 18 is provided. An inclined surface 29b that is inclined downward toward the rear is formed at a rear end portion of the guide 29. A top 29c at a front end of the inclined surface 29b is positioned above a bottom surface of the recessed portion 29a.

When the front wheel 1 of the second vehicle 100-2 is inserted into the gap SP of the first vehicle 100-1 from the rear side, a bottom surface of the pin 18 protruding from the front fork 15 of the second vehicle 100-2 comes into contact with the upper surface of the support frame 21 of the first vehicle 100-1 as indicated by the dotted line in FIG. 7. When the second vehicle 100-2 is further pushed forward in this state (arrow in FIG. 7), the pin 18 moves forward along the upper surface of the support frame 21 and the inclined surface 29b of the guide 29. Then, the pin 18 moves over the top 29c of the inclined surface 29b and is engaged with the recessed portion 29a. Thus, the front fork 15 (pin 18) of the second vehicle 100-2 is held by the support frame 21 (guide 29) of the first vehicle 100-1.

At this time, as illustrated in FIG. 5, the front wheel 1 of the second vehicle 100-2 is lifted from the road surface 3, brought into a non-grounded state, and disposed with a gap from the front fender 16 of the first vehicle 100-1. In other words, the position of the second vehicle 100-2 with respect to the first vehicle 100-1 is defined by the engagement between the pins 18 and the guides 29, and the positional relationship between the pins 18 and the guides 29 is defined such that the front wheel 1 is lifted and the front wheel 1 does not contact the front fender 16 of the front vehicle 100, which is not clearly illustrated in FIG. 5. The relationship between the first vehicle 100-1 and the second vehicle 100-2 is the same as the relationship between the second vehicle 100-2 and the third vehicle 100-3 and the relationship between the third vehicle 100-3 and the fourth vehicle 100-4, and hence the front wheels 1 of the third vehicle 100-3 and the fourth vehicle 100-4 are also in the non-grounded state.

As described above, in the present embodiment, the vehicles 100 can be sequentially coupled by the engagement between the pins 18 and the guides 29. In the coupled state of the vehicles 100, the rear wheels 2 of the coupled vehicles 100 are grounded, but the front wheels 1, which are drive wheels, are in the non-grounded state. Thus, the plurality of vehicles 100 in the coupled state can be collectively towed to a predetermined place. For example, it is possible to easily move them to a place where they are highly used as sharing vehicles. When the pins 18 are engaged with the guides 29, it is necessary to move the pins 18 upward along the upper surfaces of the support frames 21 inclined upward to the front until reaching the guides 29, but this engagement operation can be easily realized using an inertial force when the vehicle 100 is moved forward along the gap SP.

According to the first embodiment, the advantageous effects described below can be obtained.

(1) The vehicle 100 includes the front wheel 1 and the pair of left and right rear wheels 2 disposed diagonally behind the front wheel 1 on the left side and diagonally behind the front wheel 1 on the right side, and includes the pair of left and right support frames 21 extending in the front-rear direction and including the rear wheel support portions 23 rotatably supporting the pair of left and right rear wheels 2 (FIGS. 1 and 2). The pair of left and right support frames 21 are disposed so as to be separated from each other by the predetermined distance L1 such that the front wheel 1 of another vehicle 100 configured to have the same shape as the vehicle 100 can be inserted into the gap SP between the pair of left and right support frames 21 from the rear (FIG. 6). Thus, the entire length in the front-rear direction of the plurality of vehicles 100 in the parked state can be shortened, and the plurality of vehicles 100 can be efficiently parked in a limited space.

(2) The vehicle 100 further includes the front fork 15 that rotatably supports the front wheel 1 (FIG. 1). The front fork 15 includes the pair of left and right pins 18 protruding outward in the left-right direction, and the pair of left and right pins 18 are provided such that the distance L3 from the distal end of the left pin 18 to the distal end of the right pin 18 is longer than the predetermined distance L1 (FIG. 6). Thus, when the front wheel 1 is inserted into the gap SP between the left and right support frames 21 of the front vehicle 100, the pins 18 can be slid along the upper surfaces of the support frames 21, and the front wheel 1 can be easily lifted from the road surface 3.

(3) The pair of left and right support frames 21 include the guides 29 with which the pair of left and right pins 18 of the rear vehicle 100 inserted into the gap SP can be engaged from above (FIG. 7). Hence, the engagement between the pins 18 and the guides 29 allows the vehicles 100 to be easily coupled to each other while restricting the position between the pair of front and rear vehicles 100.

(4) The pair of left and right pins 18 and the pair of left and right guides 29 are provided such that when the pair of left and right pins 18 of the rear vehicle 100 are engaged with the pair of left and right guides 29, the front wheel 1 of the rear vehicle 100 is positioned above the pair of left and right rear wheels 2. Thus, since the front wheel 1 of the rear vehicle 100 is held in the non-grounded state, towing or the like of the plurality of vehicles 100 can be easily performed.

(5) The guides 29 are provided on the upper surfaces of the pair of left and right support frames 21 (FIG. 1). The pair of left and right support frames 21 are provided such that the upper surfaces thereof are inclined with a downward gradient to the rear side (FIG. 1). Thus, when the vehicle 100 is moved forward along the gap SP of the front vehicle 100, the front wheel 1 of the vehicle 100 can be easily lifted.

(6) The vehicle 100 further includes the pair of left and right steps 26 on which the left and right feet of the user PS are placed (FIG. 1). The pair of left and right steps 26 are respectively supported by the pair of left and right support frames 21 (FIG. 1). Thus, the vehicle 100 can be configured as a standing vehicle on which the user PS rides in the standing posture. This type of standing vehicle is a moving means that is small and easy to handle and can be easily used by the user PS.

(7) The pair of left and right steps 26 are rotatably supported from the horizontal position when the vehicle 100 is used to the inclined position when the vehicle 100 is not used via the pair of left and right shaft portions 24a extending in the left-right direction and disposed below the upper ends of the pair of left and right rear wheels 2 (FIG. 5). Thus, even when the steps 26 are provided at a low position so as to be in contact with the rear wheels 2, the steps 26 can be retracted above the rear wheels 2 at the time of parking.

(8) The pair of left and right steps 26 are provided such that the front end portions of the pair of left and right steps 26 are positioned above the rotation shafts 2a of the pair of left and right rear wheels 2 in the horizontal posture (FIG. 1). Thus, when the front wheel 1 of the vehicle 100 is inserted into the gap SP of the front vehicle 100, the steps 26 can be smoothly rotated upward along the rear surfaces of the rear wheels 2 of the front vehicle 100.

(9) The vehicle 100 includes the handlebar 14 disposed above the front wheel 1, the front frame 10 (support frame 11) that steerably supports the front wheel 1 according to the operation of the handlebar 14, and the coupling portion 7 that swingably supports the support frame 11 in the left-right direction with respect to the rear frame 20 (support frames 21) about the axis CL2 extending in the front-rear direction (FIGS. 1 and 3). By the front frame 10 supporting the single front wheel 1 being swingably supported via the coupling portion 7 with respect to the rear frame 20 supporting the pair of left and right rear wheels 2 in this manner, the front wheel 1 is inclined at the time of turning, and the turning performance of the vehicle 100 can be improved.

Second Embodiment

A second embodiment of the present invention will be described referring to FIG. 8A to FIG. 15B. In the following, differences from the first embodiment will be mainly described. The second embodiment is different from the first embodiment in that a locking mechanism for locking the swing of the front frame 10 with respect to the rear frame 20 is provided.

Figure 8A:
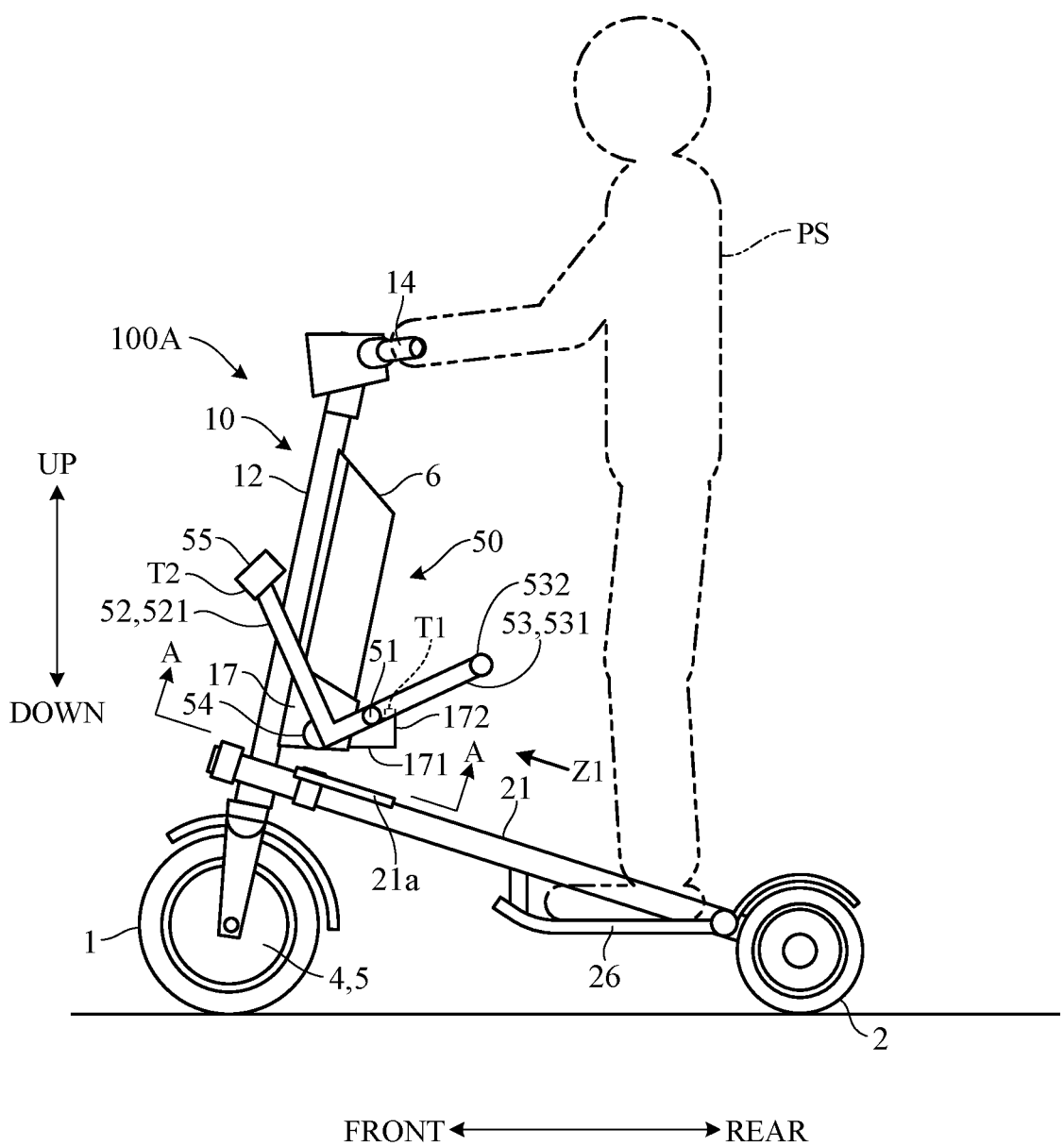
FIG. 8A is a side view illustrating an overall configuration of a vehicle according to a second embodiment of the present invention, in which a lock mechanism is in an unlocked state.
Figure 8B:
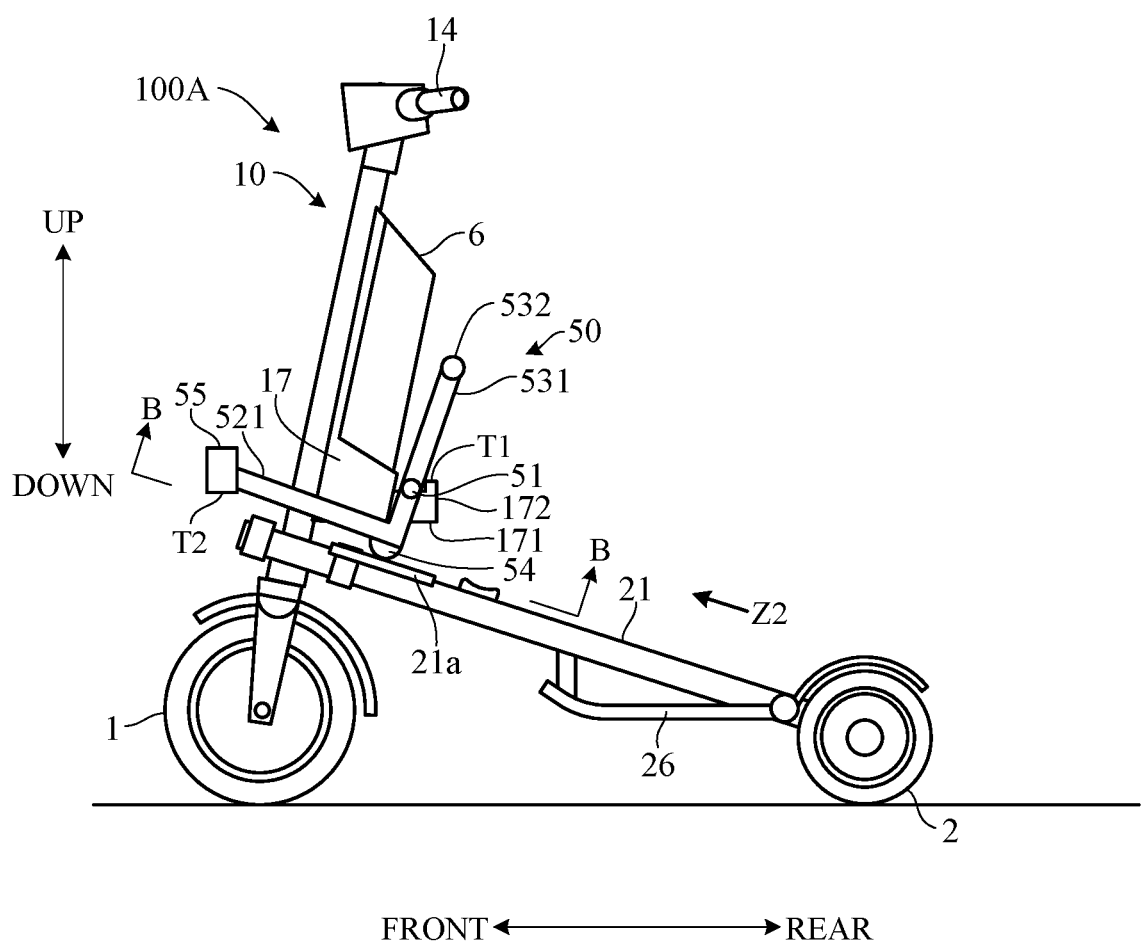
FIG. 8B is a side view illustrating the overall configuration of the vehicle according to the second embodiment of the present invention, in which the lock mechanism is in an locked state.

FIG. 8A and FIG. 8B are side views illustrating the entire configuration of a vehicle 100A according to the second embodiment. In particular, FIG. 8A is a view showing an unlocked state in which the locking mechanism is unlocked, and FIG. 8B is a view showing a locked state in which the locking mechanism is locked. The same reference numerals are given to the same parts as those in FIG. 1 and FIG. 2. As shown in FIG. 8A and FIG. 8B, a lever member 50 in which a plurality of rod-shaped members are joined to form a frame as a whole is attached to a front frame 10 of a vehicle 100A, more specifically, the holder 17 of the battery 6.

Figure 9A:
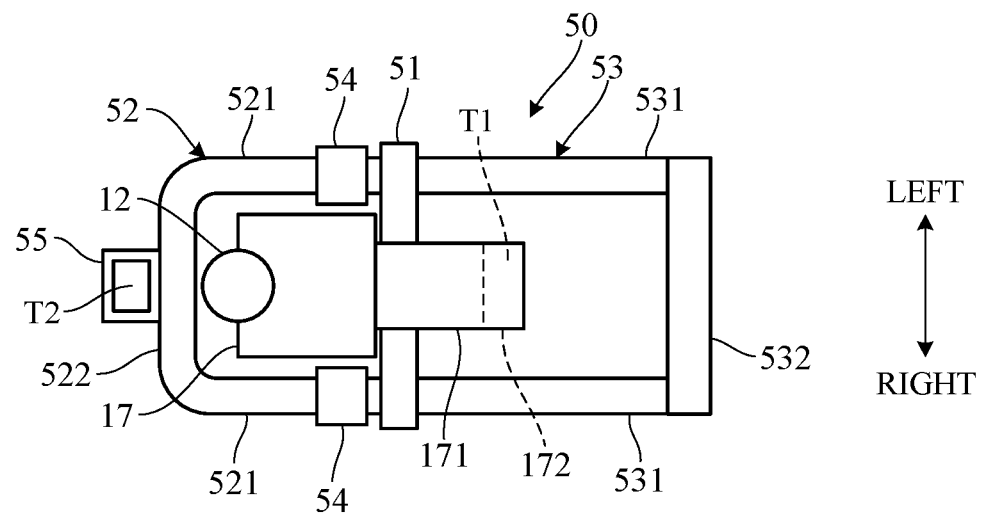
FIG. 9A is a cross-sectional view taken along line A-A in FIG. 8A.
Figure 9B:
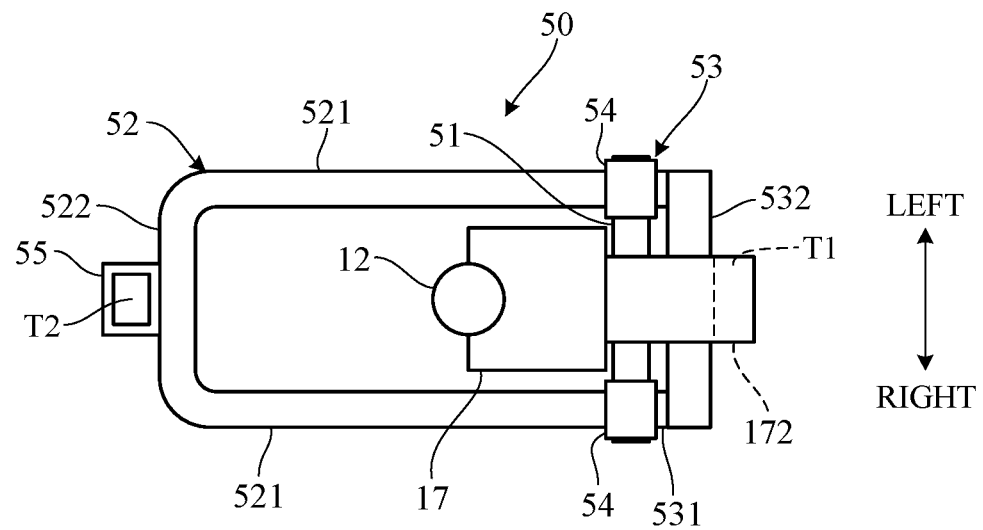
FIG. 9B is a cross-sectional view taken along line B-B in FIG. 8B.

FIG. 9A and FIG. 9B are cross-sectional views taken along A-A line of FIG. 9A and B-B line of FIG. 9B showing the configuration of each lever member 50 (view of the lever member 50 from below). As shown in FIG. 8A, FIG. 8B, FIG. 9A and FIG. 9B, at the bottom of the holder 17, the bracket 171 is projected toward the rear from its left and right direction central portion. A terminal portion 172 is provided so as to protrude upward from a distal end portion (rear end portion) of the bracket 171. An upper end portion of the terminal portion 172 is formed in a convex shape, and a positive or negative electrode T1 is provided in the convex portion.

The lever member 50 has a substantially circular shaft portion 51 extending in the left-right direction beyond the left and right end faces of the holder 17. The center portion of the shaft portion 51 in the left-right direction is rotatably supported on the upper surface of the bracket 171. A pair of front and rear arms (a front arm 52 and a rear arm 53) having a substantially cylindrical cross section are joined to the left and right end portions of the shaft portion 51. As shown in FIG. 9A and FIG. 9B, the front arm 52 has a pair of left and right side arms 521 and a connecting arm 522 extending in the left-right direction and connecting the front end portions of the side arms 521 to each other, and has a substantially U-shape in plan view. As shown in FIG. 8A, the side arm 521 is bent at a substantially right angle toward the upper side in the middle, and has a substantially L-shape in a side view.

A pad 54 having a substantially rectangular parallelepiped shape is attached to the bent portion of the side arm 521. The bottom surface of the pad 54 is formed in a substantially arc shape in the front-rear direction. A sliding material 21a is attached to the upper surfaces of the left and right support frames 21 below the pad 54 over a predetermined length in the front-rear direction. The sliding material 21a is provided to facilitate sliding of the pad 54 on the support frame 21, and is made of an elastic material such as hard rubber. The pad 54 may be formed of an elastic body.

Figure 14:
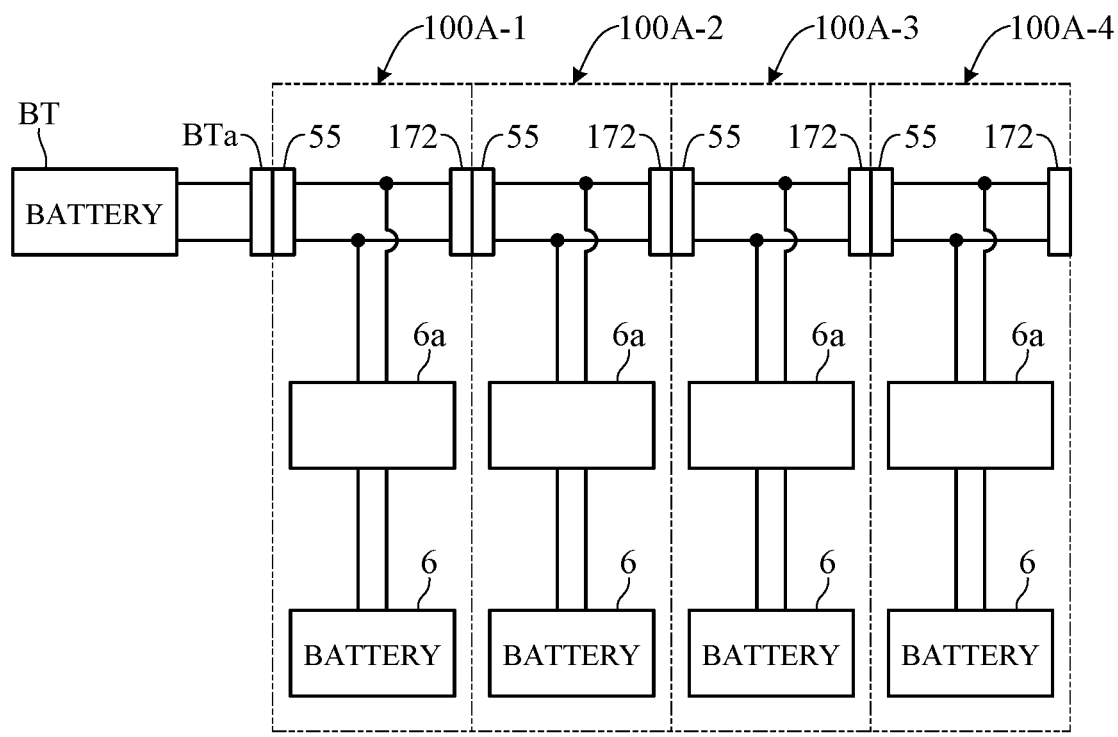
FIG. 14 is an electrical diagram schematically illustrating a configuration of a power supply circuit in the coupled state of the plurality of vehicles according to the second embodiment of the present invention.

The side arm 521 extends forward beyond the vertical frame 12 extending above the front wheel 1, and the connecting arm 522 is located forward of the vertical frame 12. A terminal portion 55 is provided so as to protrude upward and downward or downward from a central portion of the connecting arm 522 in the left-right direction. The bottom portion of the terminal portion 55 is formed in a concave shape so as to be able to be fitted into the upper end portion of the terminal portion 172 of the other vehicle 100A ahead, and a positive or negative electrode T2 is provided in the concave portion. The electrode T1 (terminal portion 172) and the electrode T2 (terminal portion 55) are connected to the battery 6 of the vehicle 100A via a power line (FIG. 14).

As shown in FIG. 9A and FIG. 9B, the rear arm 53 has a pair of left and right side arms 531 and a connecting arm 532 that connects the rear end portions of the side arms 531 to each other, and has a substantially U-shape in plan view. In the unlocked state shown in FIG. 9A, the side arm 531 extends rearward beyond the terminal portion 172, and the connecting arm 532 is located rearward of the terminal portion 172. However, as shown in FIG. 8A, it is sufficiently separated from the user PS in the standing position. The connecting arm 532 is operated upward and downward by a user PS, and thereby the lever member 50 rotates about the shaft portion 51 as a fulcrum. The position of the lever member 50 in FIG. 8A is referred to as an unlocked position, and the position of the lever member 50 in FIG. 8B is referred to as a locked position.

When the user PS operates the rear connecting arm 532 of the lever member 50 in the locked position at the maximum downward, the front connecting arm 522 abuts against the front surface of the vertical frame 12, and the upward movement of the connecting arm 522 is restricted. At this time, the lever member 50 is positioned in the unlocked position. As shown in FIG. 8A, in the unlocked position, the pad 54 is positioned above the sliding material 21a and spaced apart from the sliding material 21a.

Figure 10A:
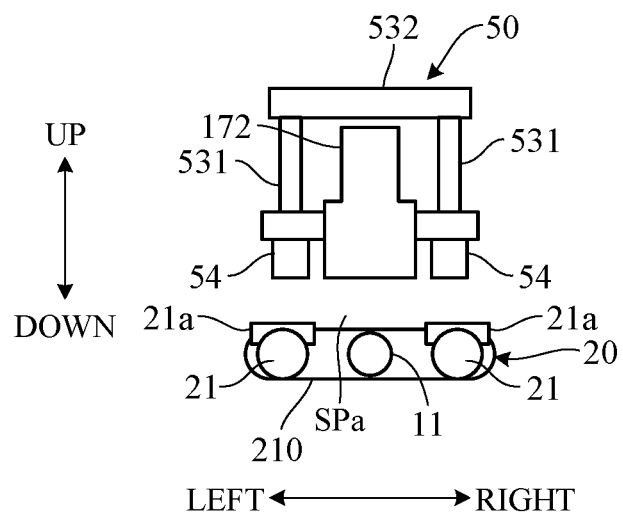
FIG. 10A is a view along an arrow Z1 in FIG. 8A.
Figure 10B:
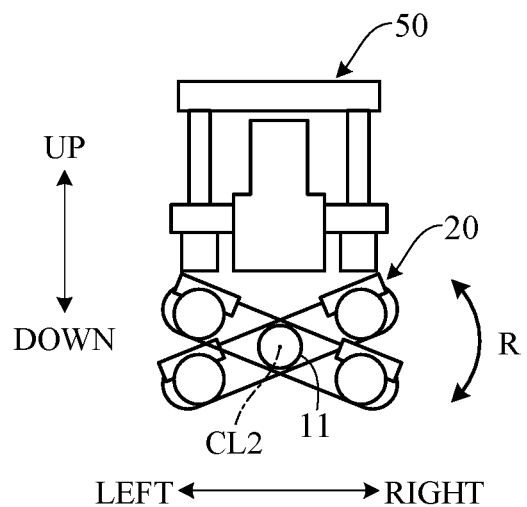
FIG. 10B is a diagram showing an operation corresponding to a configuration in FIG. 10A.

FIG. 10A is a diagram showing a positional relationship between the pad 54 and the sliding material 21a in the unlocked position (a view along an arrow Z1 in FIG. 8A). A part of the lever member 50 is not omitted in FIG. 10A. As shown in FIG. 10A, when the lever member 50 is in the unlocked position, a gap SPa is formed between the bottom surface of the pad 54 and the sliding material 21a. As a result, as shown in FIG. 10B, the rear frame 20 can swing in the direction of an arrow R about the axis CL2, and the vehicle 100A can travel while the front wheel 1 being inclined in the left-right direction.

When the user PS operates the rear connecting arm 532 upward while the lever member 50 is in the unlocked position, the pad 54 contacts the sliding material 21a. From this condition, when the user PS further operates the connecting arm 532 upward until the connecting arm 532 abuts the rear surface of the vertical frame 12 or the battery 6, the pad 54 moves rearward while sliding over the upper surface of the sliding material 21a. At this time, the lever member 50 is positioned at the locked position.

Figure 10C:
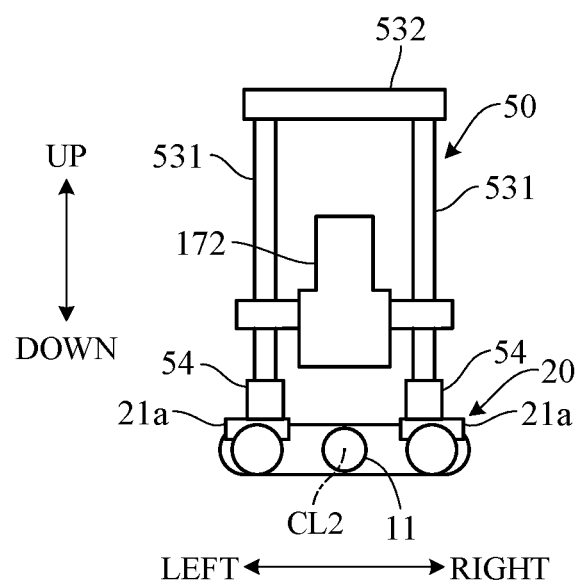
FIG. 10C is a view along an arrow Z2 in FIG. 8B.

FIG. 10C is a diagram showing a positional relationship between the pad 54 and the sliding material 21a in the locked position (a diagram along an arrow Z2 in FIG. 8B). As shown in FIG. 10C, when the lever member 50 is in the locked position, the bottom surface of the pad 54 abuts against the upper surface of the sliding material 21a. This makes it impossible to swing the frame 20 around the axis CL2.

The lever member 50 is operated to the locked position when the vehicle 100A is parked. This makes it possible to park the vehicle 100A in a stable posture in which the swing is prevented (locked). Although not shown, an outer cable in which a brake wire connected to a brake unit is accommodated is disposed in the vicinity of the lever member 50, and when the lever member 50 is operated from the unlocked position to the locked position, the outer cable is pressed by the lever member 50. As a result, a tensile force acts on the brake wire, and the brake units of the front wheel 1 and the rear wheels 2 can be operated. That is, the parking brake can be operated simultaneously by operating the lever member 50 to the locked position.

Figure 11:
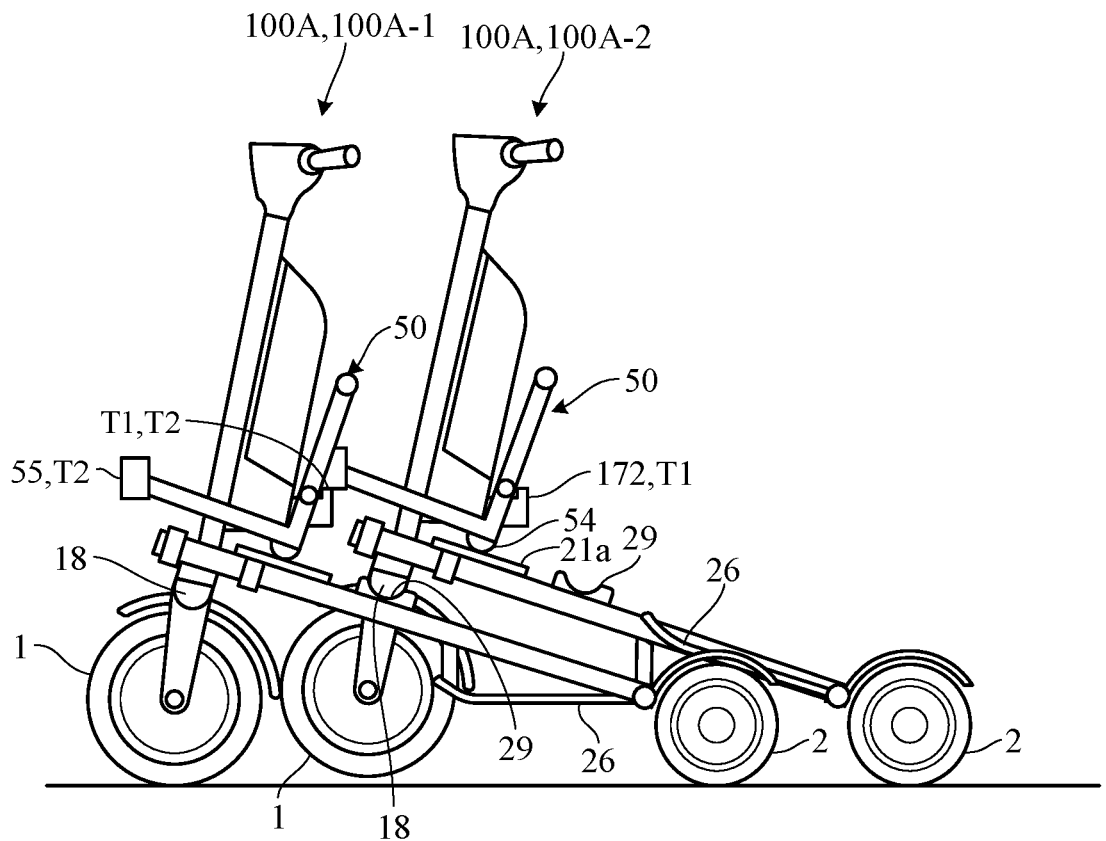
FIG. 11 is a side view illustrating a coupled state of a plurality of vehicles according to the second embodiment of the present invention.
Figure 12:
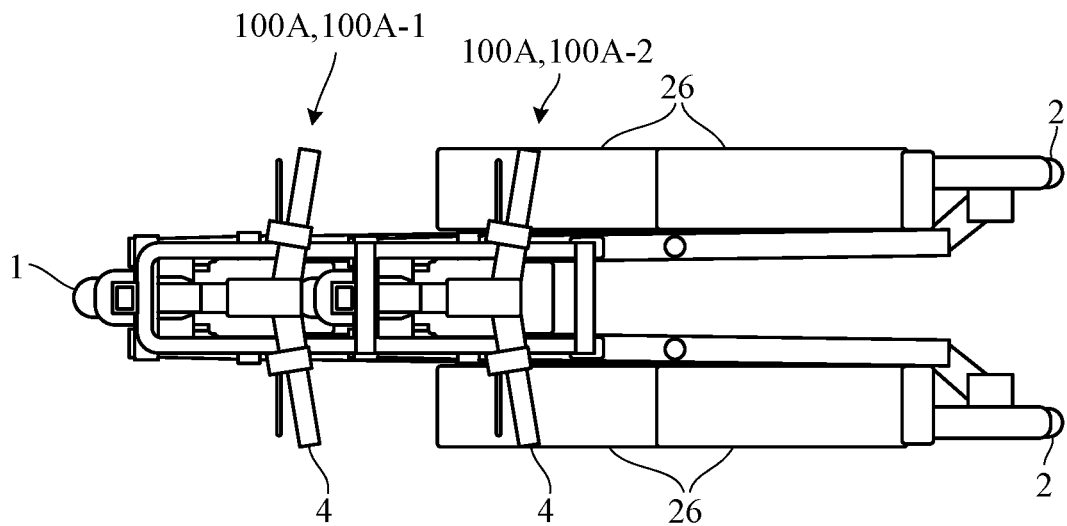
FIG. 12 is a plan view illustrating the coupling state of the plurality of vehicles according to the second embodiment of the present invention.

The lever member 50 functions not only as a locking mechanism for the vehicle 100A but also as a coupling mechanism for coupling a plurality of vehicles 100A. FIG. 11 is a side view illustrating the plurality of vehicles 100A coupled to each other via the lever member 50, and FIG. 12 is a plan view. In FIG. 11 and FIG. 12, two vehicle 100A (first vehicle 100A-1, second vehicle 100A-2) are coupled for the sake of convenience. In FIG. 11 and FIG. 12, as in FIG. 5 and FIG. 6, the pin 18 of the rear vehicle 100A, that is, pin 18 of the second vehicle 100A-2 is engaged with the guide 29 of the front vehicle 100A, that is, the guide 29 of the first vehicle 100A-1, and the front wheel 1 of the second vehicle 100A-2 is in the non-grounded state.

As shown in FIG. 11 and FIG. 12, when the lever member 50 of the second vehicle 100A-2 is operated to the locked position while the pin 18 of the second vehicle 100A-2 is engaged with the guide 29 of the first vehicle 100A-1, the terminal portion 55 of the lever member 50 of the second vehicle 100A-2 is fitted to the terminal portion 172 of the holder 17 of the first vehicle 100A-1. Accordingly, the plurality of vehicles 100A can be more firmly coupled to each other via the lever member 50. Therefore, the plurality of vehicles 100A can be easily moved from a parking lot (station) to another station.

When the terminal portion 55 of the second vehicle 100A-2 is fitted to the terminal portion 172 of the first vehicle 100A-1, the electrode T2 of the second vehicle 100A-2 and the electrode T1 of the first vehicle 100A-1 are connected. As a result, electric power can be supplied from a power supply unit installed in the station to the batteries 6 of the respective vehicle 100A. The terminal portions 55 and 172 of the vehicle 101A described above also include a terminal portion used other than a power source, for example, a terminal portion used for communicating with each other the condition of the vehicle, such as a vehicle ID for identifying the vehicle 100A and information on the remaining battery capacity. The configuration of the locking mechanisms for coupling the front and rear vehicles 101A is not limited to the configuration described above. For example, the vehicle 101A and the front or rear vehicle 101A may be mechanically joined to each other, and a locking management thereof may be electrically performed. The locking management may be performed by a physical key.

Figure 13:
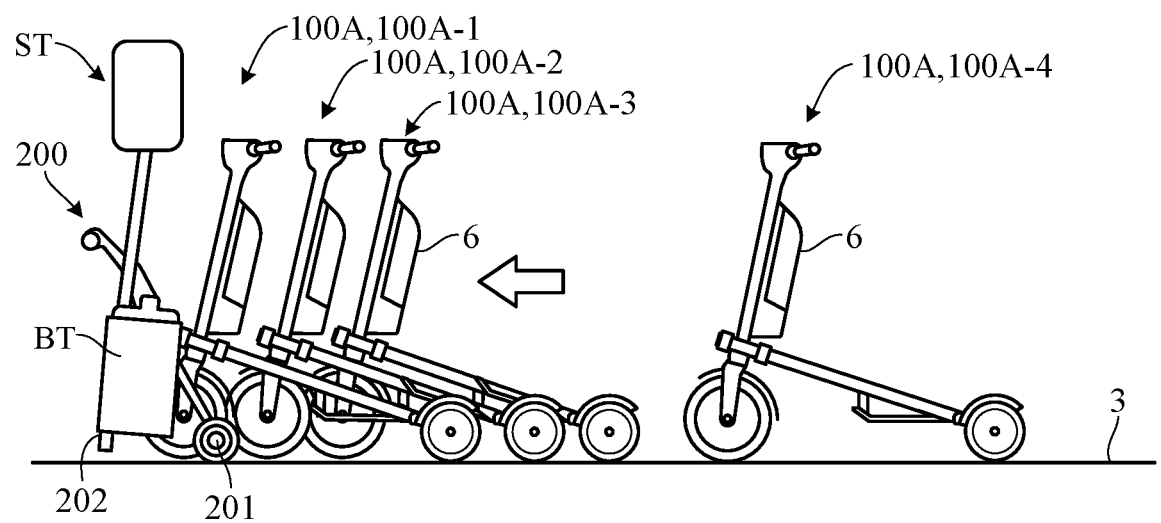
FIG. 13 is a side view illustrating a parking state of the plurality of vehicles according to the second embodiment of the present invention in a station.

FIG. 13 is a diagram illustrating an example in a case where electric power is supplied from the power supply unit installed in the station ST, that is, a battery BT for supplying electric power to the respective batteries 6 of the plurality of vehicles 100A (first vehicle 100A-1, second vehicle 100A-2, third vehicle 100A-3, fourth vehicle 100A-4). More specifically, in a state that the first vehicle 100A-1 to the third vehicle 100A-3 are parked in the station ST, the fourth vehicle 100A-4 is newly parked in the station ST as indicated by an arrow. In FIG. 13, the lever member 50 is not illustrated.

The station ST is a parking lot of the vehicles 100A, and is a rental place and a return place of the vehicles 100A when the vehicles 100A are used as sharing vehicles. Since the vehicle 100A is an electric vehicle traveling by electric power from the battery 6, when the remaining capacity of the battery 6 becomes equal to or less than a predetermined value, the vehicle 100A becomes unable to travel. Therefore, in the station ST, the battery 6 is simultaneously charged while the lever member 50 of the vehicle 100A is operated to the locked position.

The station ST may be stationary or mobile. In the case of a stationary station ST, the power supply unit may be an AC power supply, and in that case, alternating current may be converted to direct current via an AC adaptor and then the electric power may be supplied to battery 6. In a mobile station ST, the moving mechanism of the station ST may be either manual or automated. When configured as the mobile station ST, an installation position of the station ST can be changed according to the day of week, the hours, and the like. For example, the station ST may be installed in the vicinity of a train station during commuting hours and in the center of an office-town during the daytime. That is, it is possible to increase the frequency of use of the vehicle 100A by installing the station ST in a location where the use of the vehicle 100A is highly required.

FIG. 13 is a diagram showing an example of the manual mobile station ST. Specifically, a hand-push power supply cart 200 is arranged in advance in the station ST. The power supply cart 200 includes, for example, a pair of left and right tires 201 and a support pole 202, and can be self-standing by grounding of three points on ground surface 3. By folding, for example, the support pole 202 from the self-standing state in FIG. 13, the power supply cart 200 can easily move while rolling the tires 201. The power supply cart 200 is equipped with batteries BT at two positions on the left and right sides, for example.

Further, although not shown, the power supply cart 200 has a connecting portion to which the first vehicle 100A-1 is connected. More specifically, the power supply cart includes a guide (referred to as a station guide) to which the pin 18 (FIG. 11) protruding from the front fork 15 of the first vehicle 100A-1 engages and a terminal portion (referred to as a station terminal portion) to which the terminal portion 55 (FIG. 11) of the first vehicle 100A-1 is fitted. The positional relationship between the station guide and the station terminal portion is the same as the positional relationship between the guide 29 and the terminal portion 172 of the vehicles 100A. The station terminal portion has an electrode which is electrically connected to the battery BT.

Thus, when the pin 18 of the first vehicle 100A-1 is engaged with the station guide and the lever member 50 of the first vehicle 100A-1 is operated to the locked position, the terminal portion 55 of the first vehicle 100A-1 is fitted to the station terminal portion, and the first vehicle 100A-1 can be held with the front wheel 1 floated. Further, the battery 6 of the first vehicle 100A-1 is connected to the battery BT via the terminal portion 55, and the electric power of the battery BT can be supplied to the battery 6 to charge the battery 6.

As shown in FIG. 13, when the plurality of vehicles 100A-1 to 100A-4 are coupled and parked, for example, the batteries 6 of the respective vehicles 100A-1 to 100A-4 are charged as follows. FIG. 14 is an electrical diagram schematically illustrating a configuration of a power supply circuit in a coupled state of the plurality of vehicles 100A-1 to 100A-4. As shown in FIG. 14, the terminal portions 55 (electrodes T2) of the respective vehicles 100A-1 to 100A-4 are connected to the terminal portions 172 (electrodes T1) via power lines, and are connected to the batteries 6 in parallel with the terminal portions 172 via control circuits 6a constituting the power control unit.

In FIG. 14, the terminal portion 55 of the first vehicle 100A-1 is connected to the station terminal portion BTa, the terminal portion 55 of the second vehicle 100A-2 is connected to the terminal portion 172 of the first vehicle 100A-1, the terminal portion 55 of the third vehicle 100A-3 is connected to the terminal portion 172 of the second vehicle 100A-2, and the terminal portion 55 of the fourth vehicle 100A-4 is connected to the terminal portion 172 of the third vehicle 100A-3. The control circuit 6a of each vehicle 100A-1 to 100A-4 includes, for example, a power switch that connects (turns on) or disconnects (turns off) the terminal portion 55 (electrode T2) and the battery 6, and the power switch is turned on and off by the controller of the control circuit 6a.

Specifically, the controller of each vehicle 100A determine whether or not the terminal portion 55 of the other vehicle 100A is connected to the terminal portion 172, and turns off the power switch when it is determined that the terminal portions 55 is connected. On the other hand, when it is determined that the terminal portion 55 is not connected, the controller turns on the power switch. In FIG. 14, the power switches of the first vehicle 100A-1, the second vehicle 100A-2, and the third vehicle 100A-3 are turned off by the process performed by the controllers. Therefore, the batteries 6 of the first vehicle 100A-1, the second vehicle 100A-2, and the third vehicle 100A-3 are prevented from being charged from the battery BT.

On the other hand, the power switch of the fourth vehicle 100A-4 is turned on. As a result, the battery 6 of the fourth vehicle 100A-4 is charged. That is, the battery 6 of the vehicle 100A-4 located at the end of the plurality of vehicles 100A-1 to 100A-4 in the coupled state is preferentially charged. The vehicle 100A-4 located at the end among the vehicles 100A-1 to 100A-4 parked at the station ST, is first used by the user PS. Therefore, it is possible to prevent the battery 6 from being insufficiently charged when the use of the vehicle 100A is started.

A SOC sensor for detecting a state of charge of the battery 6 of each vehicle 100A may be provided, and when the state of charge detected by SOC sensor becomes equal to or greater than a predetermined value, the power switch of the vehicle 100A located in front of the vehicle having the SOC of the predetermined value or greater may be turned on. That is, the power switch of the third vehicle 100A-3 may be turned on when the state of charge of the fourth vehicle 100A-4 becomes equal to or greater than the predetermined value, the power switch of the second vehicle 100A-2 may be turned on when the state of charge of the third vehicle 100A-3 becomes equal to or greater than the predetermined value, and the power switch of the first vehicle 100A-1 may be turned on when the state of charge of the second vehicle 100A-2 becomes equal to or greater than the predetermined value.

As a result, the batteries 6 of the respective vehicles 100A-1 to 100A-4 can be sequentially charged while prioritizing them. The electric power supplied to the battery 6 of each vehicle 100A may be controlled by providing, for example, a variable resistor and controlling a resistance of the variable resistor, instead of providing an on-off type power switch in the control circuit 6a of each vehicle 100A.

As described above, in the present embodiment, by operating of the lever member 50 to the locked position by the user PS, the swing lock of the vehicle 100A, the connection between the vehicles 100A, and the connection of the terminal portion 55 for charging the battery 6 can be simultaneously performed. That is, three operations or functions can be simultaneously realized by a single turning operation of the lever member 50 by the user PS when the vehicle 100A is parked.

It may be determined that the vehicle 100A is started to be used and returned when it is determined that the terminal portion 55 is attached or detached to or from the terminal portion 172 or the station terminal portion BTa of another vehicle 100A. This makes it possible to easily calculate the use times of the vehicle 100A. Therefore, it is easy to manage the vehicle 100A, and it is possible to appropriately charge the user PS according to the usage times of the vehicle 100A.

Figure 15A:
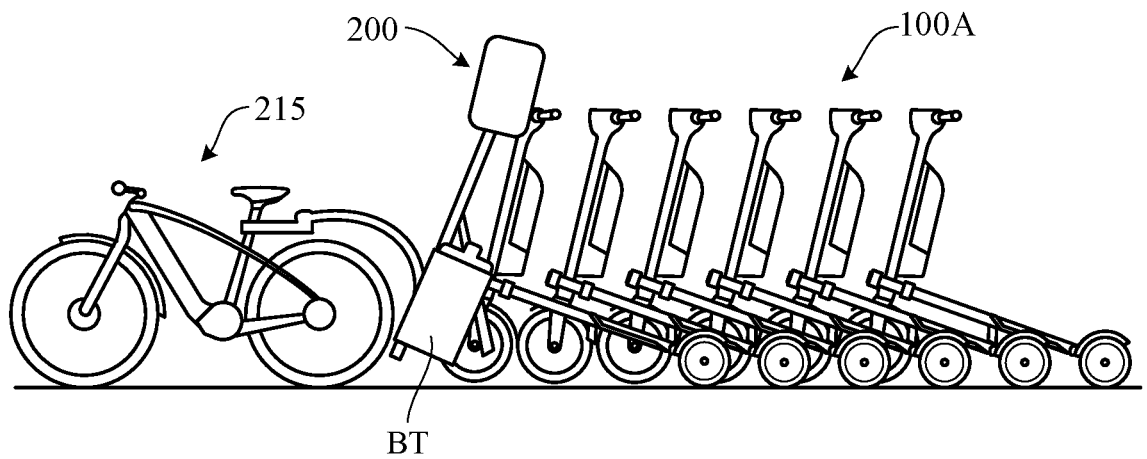
FIG. 15A is a diagram showing a modification of FIG. 13.

FIG. 15A is a diagram showing a modification of FIG. 13. In FIG. 15A, a power supply cart 200 is coupled to a two-wheeled vehicle 215, such as a bicycle. This allows the power supply cart 200 to be easily transported with a plurality of vehicles 100A in the coupled state, and allows the station ST for the vehicles 100A to be quickly installed in a new location. The power supply cart 200 may be omitted, a battery BT may be mounted on the two-wheeled vehicle 215, and a coupling portion (a station guide, a station terminal portion) to which the first vehicle 100A-1 is connected may be provided in the two-wheeled vehicle 215.

Figure 15B:
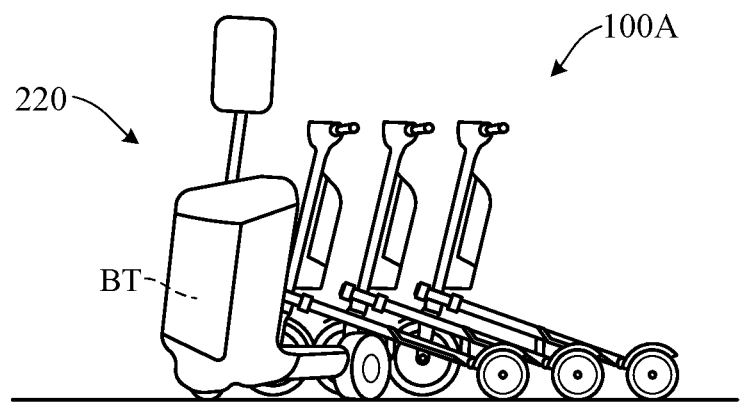
FIG. 15B is a diagram showing another modification of FIG. 13.

FIG. 15B is a diagram showing another modification of FIG. 13. In FIG. 15B, a plurality of vehicular 100A are coupled to a robot 220 having a battery BT for supplying an electric power. The robot 220 is a self-propelled robot having wheels that rotate by driving of a traveling motor. The robot 220 automatically travels along a predetermined target route at a predetermined timing according to a predetermined program. As a result, it is possible to save time and effort for the worker to transport the vehicle 100A.

According to the second embodiment, in addition to the advantageous effects of the first embodiment, the following advantageous effects can be obtained.

(1) The vehicle 100A further includes a lever member 50 rotatably attached to the front frame 10 (holder 17) so as to be movable between an unlocked position in which the swing of the front frame 10 (support frame 11) relative to the rear frame 20 (support frame 21) is permitted and a locked position in which the swing is prohibited, by an operation by a user PS (FIG. 8A, FIG. 8B). Accordingly, the swing of the vehicle 100A can be locked at the state of parking, and the vehicle 100A can be stably parked.

(2) The vehicle 100A includes a traveling motor 4 that drives the front wheel 1 and a battery 6 that supplies electric power to the traveling motor 4 (FIG. 8A). The lever member 50 has a terminal portion 55 (electrode T2) electrically connected to the battery 6 (FIG. 8A). Accordingly, by operating of the lever member 50, the battery 6 can be connected to the battery BT for supplying electric power installed in the station ST via the terminal portion 55 (FIG. 14), and the battery 6 can be easily charged.

(3) The terminal portion 55 is provided so as to be electrically connected to the terminal portion 172 (electrode T1) of another vehicle 100A disposed in front of the vehicle 100A, that is, the other vehicle 100A having the same configuration as the vehicle 100A, when the lever member 50 is in the locked position (FIG. 11). As a result, the terminal portion 55 can be easily connected to the battery BT for supplying electric power via the terminal portions 55 and 172 of the other vehicular 100A.

(4) The terminal portion 55 of the first vehicle 100A-1 parked at the foremost portion is provided so as to be connected to a battery BT provided in the power supply cart 200 or the like disposed in the station ST when the lever member 50 is in the locked position (FIG. 13). Accordingly, the first vehicle 100A-1 and the battery BT for supplying electric power can be easily connected by operating of the lever member 50.

Third Embodiment

A third embodiment of the present invention will be described referring to FIG. 16A to FIG. 19. In the following, differences from the second embodiment will be mainly described. The third embodiment is different from the second embodiment mainly in the configuration of the lever member 50. That is, in the third embodiment, a seat on which the user PS can sit is provided integrally with the lever member 50.

Figure 16A:
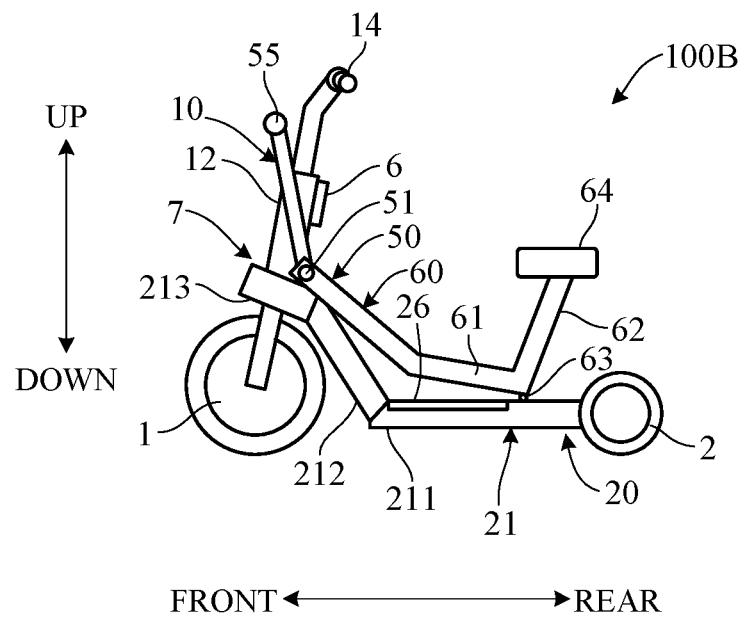
FIG. 16A is a side view illustrating an overall configuration of a vehicle according to a third embodiment of the present invention, in which a lever member is operated to an unlocked position.
Figure 16B:
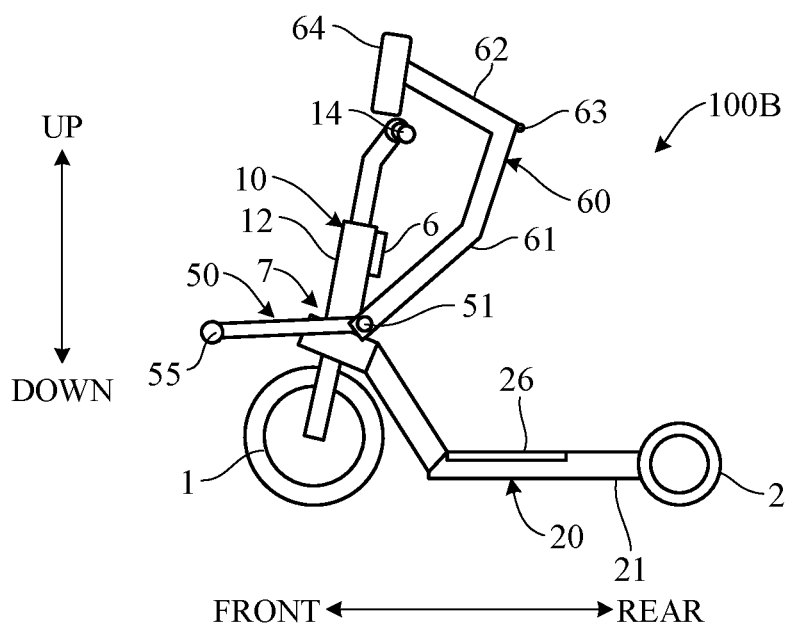
FIG. 16B is a side view illustrating an overall configuration of the vehicle according to the third embodiment of the present invention, in which the lever member is operated to a locked position.
Figure 17A:
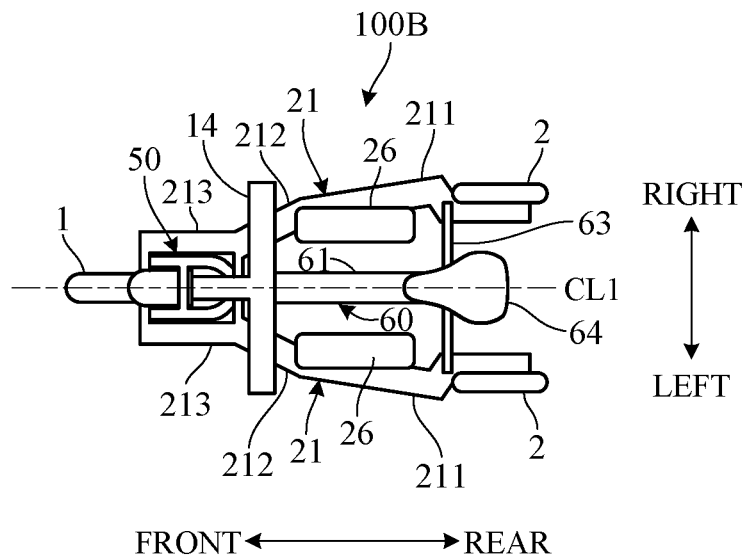
FIG. 17A is a plan view illustrating an overall configuration of the vehicle according to the third embodiment of the present invention, in which the lever member is operated to the unlocked position.
Figure 17B:
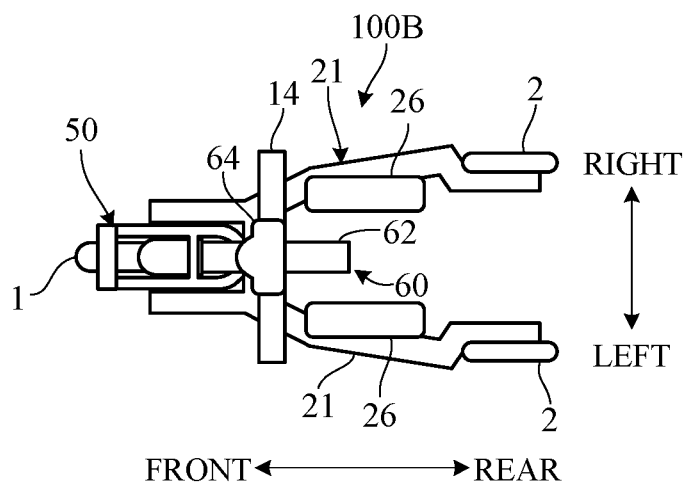
FIG. 17B is a plan view illustrating an overall configuration of the vehicle according to the third embodiment of the present invention, in which the lever member is operated to the locked position.

FIG. 16A and FIG. 16B are side views of a vehicle 100B according to the third embodiment, and FIG. 17A and FIG. 17B are plan views. FIG. 16A and FIG. 17A show a state in which the lever member 50 is operated to the unlocked position, and FIG. 16B and FIG. 17B show a state in which the lever member 50 is operated to the locked position. In the third embodiment, the configuration of the pair of left and right support frames 21 is also different from that of the second embodiment.

That is, as shown in FIG. 16A, the support frame 21 includes a horizontal portion 211 extending substantially horizontally in the front-rear direction, a first inclined portion 212 extending obliquely upward at a first inclination angle with respect to the horizontal line from a front end of the horizontal portion 211, and a second inclined portion 213 extending obliquely upward at a second inclination angle smaller than the first inclination angle from a front end of the first inclined portion 212. The coupling portion 7 for swingably connecting the front frame 10 and the rear frame 20 is provided in the second inclined portion 213. As shown in FIG. 17A, the left and right steps 26 are supported by the horizontal portions 211 of the left and right support frames 21, respectively. Further, the pair of left and right support frames 21 are configured such that the first inclined portion 212 and the horizontal portion 211 extend obliquely toward the rear and toward the outside in the left-right direction. As a result, the support frame 21 has a substantially V-shape in plan view as a whole, and the distance between the left and right support frames 21 is enlarged toward the rear.

The positions of the pair of left and right steps 26 are the same as those of the second embodiment (FIG. 8A, FIG. 12). However, in the third embodiment, since the support frame 21 is configured in a substantially V-shape in plan view, the pair of left and right steps 26 is disposed on the left and right inner sides of the pair of left and right support frames 21. Therefore, when the other vehicle 100B is coupled to the rear side of the vehicle 100B, the front wheel 1 of the other vehicle 100B need only be inserted from the rear side between the left and right steps 26 enlarged from the distance L1 of FIG. 6, and the vehicle 100B can be easily coupled.

As shown in FIG. 16A, FIG. 16B, FIG. 17A and FIG. 17B, a seat frame 60 is joined to the central portion in the left-right direction of the shaft portion 51 of the lever member 50. As shown in FIG. 16A and FIG. 17A, the seat frame 60 includes a first seat frame 61 in which a front end portion is joined to the shaft portion 51 and extends rearward along the center line CL1 with the lever member 50 positioned in the unlocked position, a second seat frame 62 erected obliquely rearward from the rear end portion of the first seat frame 61, and a third seat frame 63 extending in the left-right direction at the connecting portion between the first seat frame 61 and the second seat frame 62. Each of the seat frames 61 to 63 has, for example, a substantially cylindrical cross-section.

The third seat frame 63 extends to the left and right support frames 21, and when the lever member 50 is positioned in the unlocked position, the left and right end portions of the third seat frame 63 are placed on an upper surface of the horizontal portion 211 of the support frame 21. Therefore, downward rotation of the lever member 50 is prevented, and the lever member 50 is supported in the unlocked position. A seat cushion 64 on which a user PS can sit is provided at an upper end portion of the second seat frame 62.

Figure 18A:
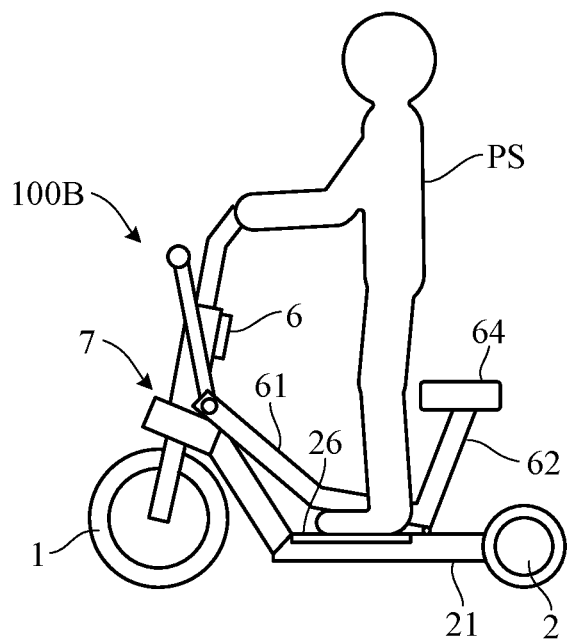
FIG. 18A is a side view illustrating a state riding in a standing posture on the vehicle according to the third embodiment of the present invention.
Figure 18B:
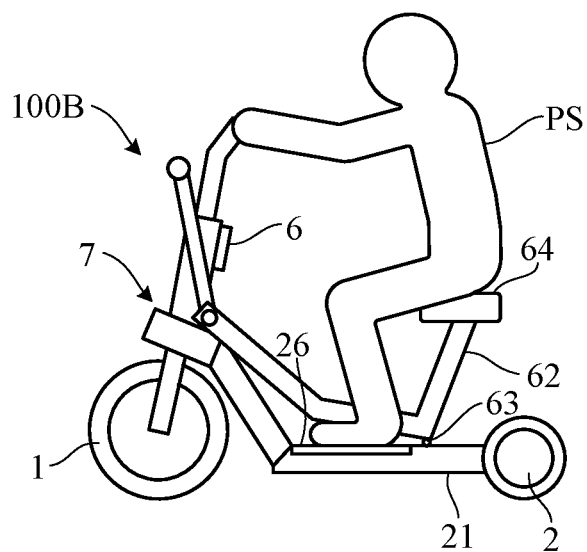
FIG. 18B is a side view illustrating a state riding in a sitting posture on the vehicle according to the third embodiment of the present invention.

FIG. 18A and FIG. 18B are diagrams illustrating examples of riding posture of the user PS when the lever member 50 is operated to the unlocked position. In particular, FIG. 18A shows a standing posture and FIG. 18B shows a sitting posture.

As shown in FIG. 18A, in the standing posture, the user PS stands on the upper surfaces of the left and right steps 26 with his/her feet placed thereon. In this condition, the first seat frame 61 is disposed under the crotch of the user PS, and the second seat frame 62 and the seat cushion 64 are located behind the user PS. Therefore, even when the seat is integrally provided with the lever member 50, the user PS in the standing posture is not prevented from driving, and the user PS can drive the vehicle 100B while swinging the front frame 10 via the coupling portion 7 by tilting the body to the left and right with the ankle as a fulcrum.

As shown in FIG. 18B, in the sitting position, the user PS sits on the seat cushion 64 while both feet are placed on the steps 26. In this condition, the weight of the user PS acts on the left and right support frames 21 via the seat cushion 64.

Thus, the left and right end portions of the third seat frame 63, which is a part of the front frame 10, are pressed against the rear frame 20 (the support frame 21), so that the swinging of the front frame 10 with respect to the rear frame 20 in the left-right direction is suppressed, and the user PS can ride on the vehicle 100B in a stable posture.

Spring portions may be provided at both left and right end portions of the third seat frame 63, and the seat frame 60 may be supported so as to be swingable via the spring portions. In this case, a support stiffness of the spring portions may be increased by the action of the weight of the user PS. As a result, the swing of the front frame 10 can be suppressed more than in the standing posture during the sitting posture. A switch turned on when the user is seated may be provided on the seat cushion, and the maximum vehicle speed of the vehicle 100B may be limited when the switch is turned on than when the switch is turned off. For example, the maximum vehicle speed at the time of switching on may be limited to a predetermined vehicle speed (for example, 6 km/h). Thus, the vehicle 100B can be used as a vehicle (so-called senior car) capable of traveling on a sidewalk.

Figure 19:
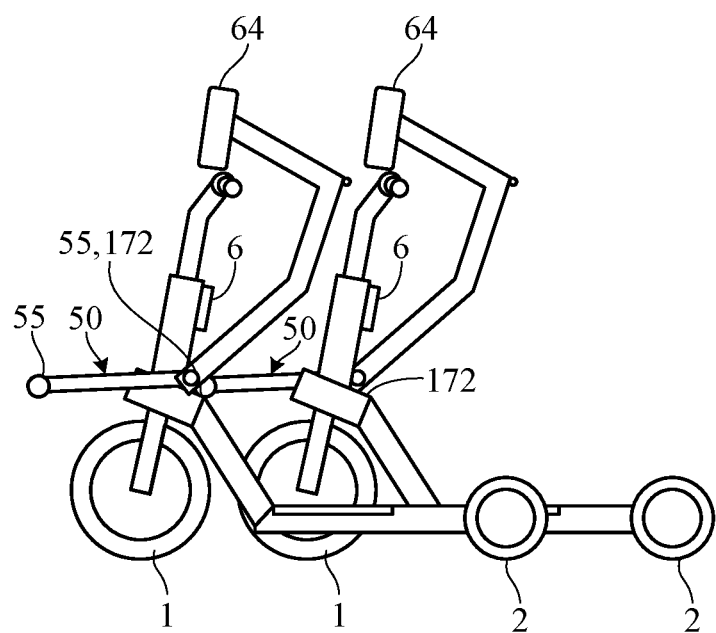
FIG. 19 is a side view illustrating a coupled state of a plurality of vehicles according to the third embodiment of the present invention.

FIG. 19 is a side view illustrating the plurality of vehicle 100B (a first vehicle 100B-1 and a second vehicle 100B-2) according to the third embodiment coupled to each other via a lever member 50. Although not shown, in the third embodiment as in the second embodiment, when the lever member 50 is rotated to the locked position, the terminal portions 55 and 172 are connected to each other so that the battery 6 can be charged.

According to the third embodiment, in addition to the advantageous effects of the first embodiment and the second embodiment, the following advantageous effects can be obtained.

(1) The vehicle 100B further includes a seat (seat frame 60, seat cushion 64) provided to be rotatable integrally with the lever member 50 so that the user PS cannot be seated when the lever member 50 is positioned in the locked position while being seated when it is positioned in the unlocked position (FIG. 16A and FIG. 16B). Accordingly, while suppressing an increase of the parking space when the vehicle 100B is parked, the user PS can ride on the vehicle 100B in the sifting posture when the vehicle 100B is used.

(2)The seat is supported by the pair of left and right support frames 21 when the lever member 50 is in the unlocked position (FIG. 16A). As a result, the swing of the front frame 10 is suppressed, and the user PS can ride on the vehicle 100B in a stable posture.

The above embodiments can be modified in various forms. Several modifications will be described below. In the above embodiment, the vehicles 100, 100A and 100B are configured to have a single front wheel 1 and a pair of left and right rear wheels 2. However, the configuration of the wheels is not limited to the above one as long as the vehicle has one front wheel and two rear wheels respectively disposed diagonally behind the front wheel on a left side and diagonally behind the front wheel on a right side. The one front wheel includes not only a single front wheel but also a pair of front wheels, that is, a pair of front wheels provided at one place, for example.

In the above embodiment, the support frames 21 as a pair of left and right support members having the rear wheel support portions 23 (a support portion) are extended in the front-rear direction. However, as long as support members are disposed so as to be separated from each other by a predetermined distance so that a front wheel of another vehicle is insertable into a gap between the pair of left and right support members from a rear side, the configuration of the support members is not limited to the above configuration. In the above embodiment, the pair of left and right pins 18 are provided to project from the front fork 15 serving as a front wheel support portion that rotatably supports the front wheel. However, the configuration (shape, mounting position, and the like) of a protruding portion is not limited to the above configuration as long as it is provided to protrude outward in the left-right direction from the front wheel support portion. The configuration of the guide 29 with which the pin 18 is engaged, that is, the configuration of an engagement portion is not also limited to the configuration described above.

In the above embodiment, the steps 26 are supported by the pair of left and right support frames 21 so as to be rotatable between the horizontal position at the time of riding and the inclined position at the time of non-riding. However, the configuration of placement portions on which feet of an occupant is placed is not limited to the above configuration. The placement portion may be omitted. In the above embodiment, the front frame 10 (a second part) for rotatably supporting the front wheel 1 in accordance with the operation of the handlebar 14 (a steering portion) and the support frame 21 (a first part) are connected to each other via the coupling portion 7 so as to be rotatable about the axis CL2. However, the configuration of a coupling portion for swingably supporting the second part in the left-right direction with respect to the first part is not limited to the above configuration. The swing mechanism may be omitted from the vehicle.

In the above embodiment, the lever member 50 is rotatably provided so as to be movable between an unlocked position (a first position) that permits the swing of the front frame 10 with respect to the support frame 21 and a locked position (a second position) that prohibits the swing. However, the configuration of an operation part movable between the first position and the second position by the operation of the occupant is not limited to the above configuration. Instead of prohibiting the swing when the operation part is operated to the second position, the swing when the operation part is operated to the second position may be suppressed more than the swing when the operation part is operated to the first position.

In the above embodiment, the traveling motor 4 (an electric motor) and the battery 6 (a storage unit) are mounted on the vehicles 100, 100A and 100B, and the vehicles 100, 100A and 100B are configured as an electric vehicle. However, the vehicle may be other than the electric vehicle. In the above embodiment, the front wheel 1 of the other vehicle (a first other vehicle) is inserted from the rear side of the vehicle 100, 100A, 100B, and the terminal portion 55 is provided in the lever member 50 so as to be connectable to the terminal portion 172 of the other vehicle (a second other vehicle) in front of the vehicle 100, 100A, 100B. However, a terminal portion may be provided in other position. In the above embodiment, the power supply cart 200 or the like is disposed on the station ST so as to support the leading vehicle 100, 100A, 100B. However, the configuration of a vehicle support having a power supply portion connected to the terminal portion of the vehicle is not limited to the above configuration.

In the above embodiment, the seat (the seat frame 60 and the seat cushion 64) is provided integrally with the lever member 50. However, the configuration of a seat portion may be any configuration as long as it is provided so as to be movable integrally with the operation part so that the occupant is seatable when the operation part is in the first position, while the occupant is not seatable when the operation part is in the second position. In the above embodiment, the seat frame 60 is supported by the support frame 21 when the lever member 50 is positioned in the unlocked position. However, the configuration of the support portion for the seat portion is not limited thereto.

In the above embodiment, the swing of the front frame 10 with respect to the rear frame 20 is locked or unlocked by the rotation of the lever member 50. However, this configuration can be similarly applied without having a gap SP into which the front wheel 1 can be inserted between the pair of left and right support frames 21. That is, as long as the vehicle is configured such that the front frame is swingable with respect to the rear frame, the swing can be locked or unlocked in the same manner as described above via an operation part movable between the first position and the second position.

The above explanation is an explanation as an example and the present invention is not limited to the aforesaid embodiment or modifications unless sacrificing the characteristics of the invention. The aforesaid embodiment can be combined as desired with one or more of the aforesaid modifications. The modifications can also be combined with one another.

REFERENCE SIGNS LOST 1 front wheel, 2 rear wheel, 4 traveling motor, 6 battery, 7 coupling portion, 10 front frame, 14 handlebar, 18 pin, 20 rear frame, 21 support frame, 24a shaft portion, 26 step, 29 guide, 50 lever member, 55 terminal portion, 60 seat frame, 64 seat cushion, 100, 100A, 100B vehicle, 172 terminal portion, 200 power supply cart

The invention claimed is:

1. A vehicle, comprising:
   a front wheel; and
   a pair of left and right rear wheels disposed diagonally behind the front wheel on a left side and diagonally behind the front wheel on a right side, wherein
   the vehicle further comprises
      a pair of left and right support members extending in a front-rear direction and including support portions rotatably supporting the pair of left and right rear wheels,
      the pair of left and right support members are disposed so as to be separated from each other by a predetermined distance so that a front wheel of another vehicle configured to have a same shape as the vehicle is insertable into a gap between the pair of left and right support members from a rear side, and include engagement portions configured so that the vehicle and the other vehicle engage when the front wheel of the other vehicle has been inserted from the rear side, and
      the engagement portions are located forward of front ends of the pair of left and right rear wheels.

2. The vehicle according to claim 1, further comprising a front wheel support portion rotatably supporting the front wheel, wherein
   the front wheel support portion includes a pair of left and right protruding portions provided so as to protrude outward in a left-right direction, and
   the pair of left and right protruding portions are provided so that a distance from a distal end of one of the pair of left and right protruding portions to a distal end of another of the pair of left and right protruding portions is longer than the predetermined distance.

3. The vehicle according to claim 2, wherein
the pair of left and right protruding portions and the engagement portions are provided so that when the pair of left and right protruding portions of the other vehicle are engaged with the engagement portions, the front wheel of the other vehicle is positioned above the pair of left and right rear wheels of the vehicle.

4. The vehicle according to claim 1, wherein
the engagement portions are provided to bulge upward on upper surfaces of the pair of left and right support members, and
the pair of left and right support members are provided so that the upper surfaces are inclined with an upward gradient from rear end portions of the pair of left and right support members to the engagement portions.

5. The vehicle according to claim 1, further comprising
a pair of left and right placement portions on which left and right feet of an occupant are placed, wherein
the pair of left and right placement portions are respectively supported by the pair of left and right support members, and
the engagement portions are located forward of the pair of left and right placement portions.

6. The vehicle according to claim 5, wherein
the pair of left and right placement portions are rotatably supported from a horizontal position when the vehicle is used to an inclined position when the vehicle is not used, via a pair of left and right shaft portions extending in a left-right direction and disposed below upper ends of the pair of left and right rear wheels.

7. The vehicle according to claim 6, wherein
the pair of left and right placement portions are provided so that front end portions of the pair of left and right placement portions are positioned above rotation shafts of the pair of left and right rear wheels when the pair of left and right placement portions are in the horizontal position.

8. The vehicle according to claim 1, wherein
the left and right support members are included in a first part, and
the vehicle further comprises:
a steering portion disposed above the front wheel;
a second part supporting steerably the front wheel in accordance with an operation of the steering portion; and
a coupling portion supporting swingably the second part relative to the first part in a left-right direction about an axis extending in the front-rear direction.

9. The vehicle according to claim 8, further comprising
an operation part attached movably to the first part or the second part so as to be movable by an operation of an occupant between a first position in which a swing of the second part relative to the first part is permitted and a second position in which the swing is prohibited or suppressed.

10. The vehicle according to claim 9, further comprising
an electric motor driving the front wheel; and
a storage unit supplying an electric power to the electric motor, wherein
the operation part includes a terminal portion connected electrically to the storage unit.

11. The vehicle according to claim 10, wherein
the other vehicle is a first other vehicle, and
the terminal portion is provided so as to be connected electrically to a terminal portion of a second other vehicle configured to have a same shape as the vehicle and disposed in front of the vehicle when the operation part is in the second position.

12. The vehicle according to claim 10, wherein
the terminal portion is provided so as to be connected to a power supply unit mounted on a vehicle support disposed in front of the vehicle so as to support the vehicle when the operation part is in the second position.

13. The vehicle according to claim 1, further comprising:
a steering portion disposed above the front wheel; and
a shaft member extending in an up-down direction above the front wheel to support the steering portion, wherein
the pair of left and right support members are provided so as to incline with an upward gradient from rear end portions to front end portions of the pair of left and right support members, and
the front end portions of the pair of left and right support members are located forward of the shaft member.

* * * * *